(12) United States Patent
Cisar et al.

(10) Patent No.: US 6,733,913 B2
(45) Date of Patent: May 11, 2004

(54) FUEL CELL SYSTEM FOR LOW PRESSURE OPERATION

(75) Inventors: Alan J. Cisar, Cypress, TX (US); Dacong Weng, Rancho Palos Verdes, CA (US); Oliver J. Murphy, Bryan, TX (US)

(73) Assignee: Lynntech, Inc., College Station, TX (US)

(*) Notice: Subject to any disclaimer, the term of this patent is extended or adjusted under 35 U.S.C. 154(b) by 0 days.

(21) Appl. No.: 10/119,380

(22) Filed: Apr. 9, 2002

(65) Prior Publication Data

US 2002/0195335 A1 Dec. 26, 2002

Related U.S. Application Data

(60) Division of application No. 09/523,910, filed on Mar. 13, 2000, now Pat. No. 6,410,180, which is a division of application No. 08/926,547, filed on Sep. 10, 1997, now Pat. No. 6,054,228, which is a continuation-in-part of application No. 08/656,968, filed on Jun. 6, 1996, now Pat. No. 5,709,961.

(51) Int. Cl.[7] .............................. H01M 8/10; C25B 9/00
(52) U.S. Cl. ............................ 429/32; 429/30; 429/33; 429/40; 429/41; 429/44; 204/252; 204/254; 204/267; 204/268; 204/278.5; 204/280; 204/283; 204/284
(58) Field of Search ............................ 429/32, 30, 33, 429/40, 41, 44; 204/252, 254, 267, 268, 278.5, 280, 283, 284

(56) References Cited

U.S. PATENT DOCUMENTS

| | | | |
|---|---|---|---|
| 3,134,697 A | 5/1964 | Niedrach | 136/86 |
| 3,297,484 A | 1/1967 | Niedrach | 136/86 |
| 3,297,485 A | 1/1967 | Tocker | 429/33 |
| 3,432,355 A | 3/1969 | Niedrach et al. | 136/86 |
| 3,854,994 A | 12/1974 | Binder | 117/216 |
| 4,235,693 A | 11/1980 | Rowe | 204/229 |

(List continued on next page.)

FOREIGN PATENT DOCUMENTS

DE        44 43 945 C1        5/1996

OTHER PUBLICATIONS

Leonard T. Skeggs, Cathode Air Recirculation and Moisture Control, Int'l Pub. No. WO94/25991, dated Nov. 10, 1994, pp. 1–25 w/ 5 figures.

(List continued on next page.)

*Primary Examiner*—Bruce F. Bell
(74) *Attorney, Agent, or Firm*—Streets & Steele; Jeffrey L. Streets

(57) ABSTRACT

This invention is an improved fuel cell design for use at low pressure. The invention has a reduced number of component parts to reduce fabrication costs, as well as a simpler design that permits the size of the system to be reduced at the same time as performance is being improved.

In the present design, an adjacent anode and cathode pair are fabricated using a common conductive element, with that conductive element serving to conduct the current from one cell to the adjacent one. This produces a small and simple system suitable for operating with gas fuels or alternatively directly with liquid fuels, such as methanol, dimethoxymethane, or trimethoxymethane. The use of these liquid fuels permits the storage of more energy in less volume while at the same time eliminating the need for handling compressed gases which further simplifies the fuel cell system. The electrical power output of the design of this invention can be further increased by adding a passage for cooling the stack through contact with a coolant.

27 Claims, 16 Drawing Sheets

U.S. PATENT DOCUMENTS

| | | | | |
|---|---|---|---|---|
| 4,364,805 A | | 12/1982 | Rogers | 204/98 |
| 4,596,648 A | | 6/1986 | Sweeney | 204/237 |
| 4,876,115 A | | 10/1989 | Raistrick | 427/115 |
| 5,053,375 A | | 10/1991 | Rao | 502/101 |
| 5,171,646 A | | 12/1992 | Rohr | 429/32 X |
| 5,242,764 A | | 9/1993 | Dhar | 429/30 |
| 5,246,792 A | | 9/1993 | Watanabe | 429/33 |
| 5,364,711 A | | 11/1994 | Yamada et al. | 429/15 |
| 5,536,379 A | | 7/1996 | Nonka et al. | 429/44 |
| 5,599,638 A | | 2/1997 | Surampudi et al. | 429/33 |
| 5,686,197 A | | 11/1997 | Nishida et al. | 429/30 |
| 5,709,961 A | * | 1/1998 | Cisar et al. | 429/32 |
| 5,840,438 A | | 11/1998 | Johnson et al. | 429/30 |
| 5,861,221 A | | 1/1999 | Ledjeff et al. | 429/32 |
| 5,863,671 A | | 1/1999 | Spear, Jr. et al. | 429/12 |
| 5,863,672 A | | 1/1999 | Ledjeff et al. | 429/26 |
| 5,952,118 A | | 9/1999 | Ledjeff et al. | 429/32 |
| 5,989,741 A | * | 11/1999 | Bloomfield et al. | 429/32 |
| 6,054,228 A | * | 4/2000 | Cisar et al. | 429/18 |
| 6,194,095 B1 | | 2/2001 | Hockaday | 429/34 |

OTHER PUBLICATIONS

Iwata Tomoo, Solid Electrolyte Fuel Cell, Patent Abstracts of Japan, Pub. No. 06243879, dated Jan. 9, 1994, 1 page.

Alan J. Cisar, Fuel Cell System for Low Pressure Operation, Int'l. Pub. No. WO 99/34467, dated Jul. 8, 1999, pp. 1–53 with 44 figures.

* cited by examiner

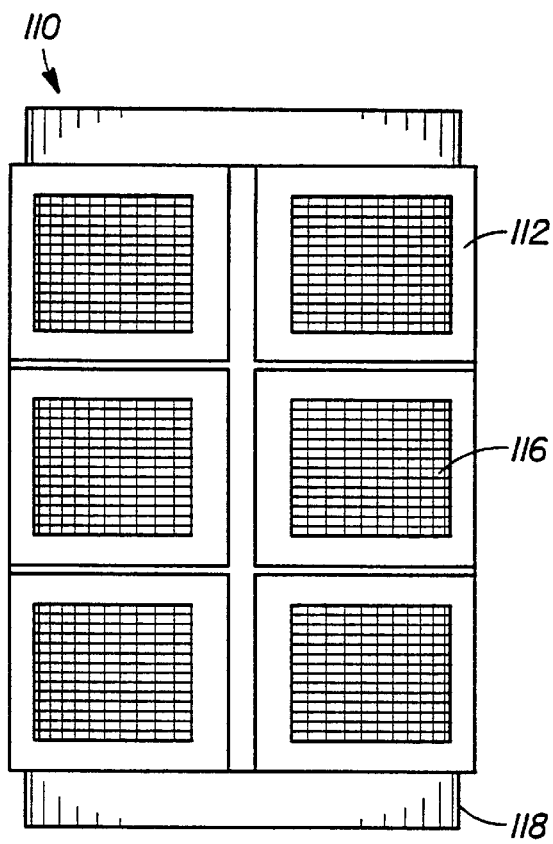
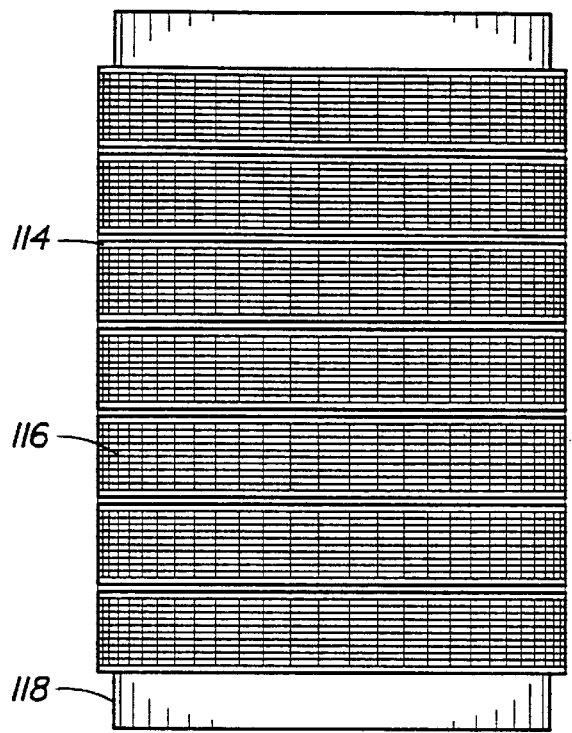
FIG. 13A　　　　　　　　　FIG. 13B
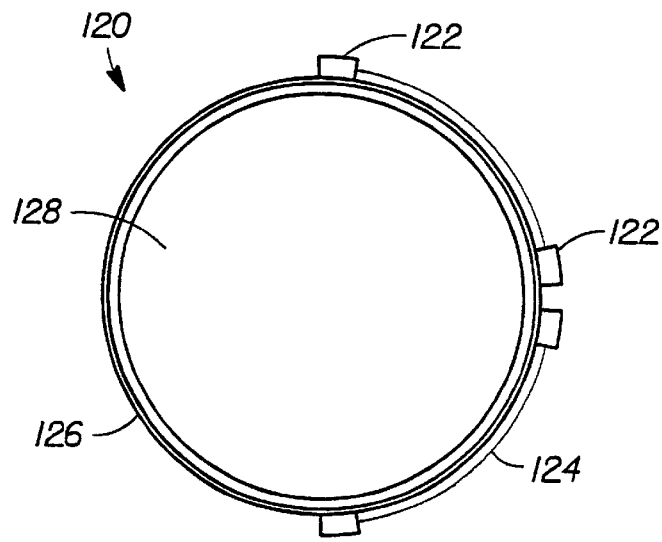
FIG. 14

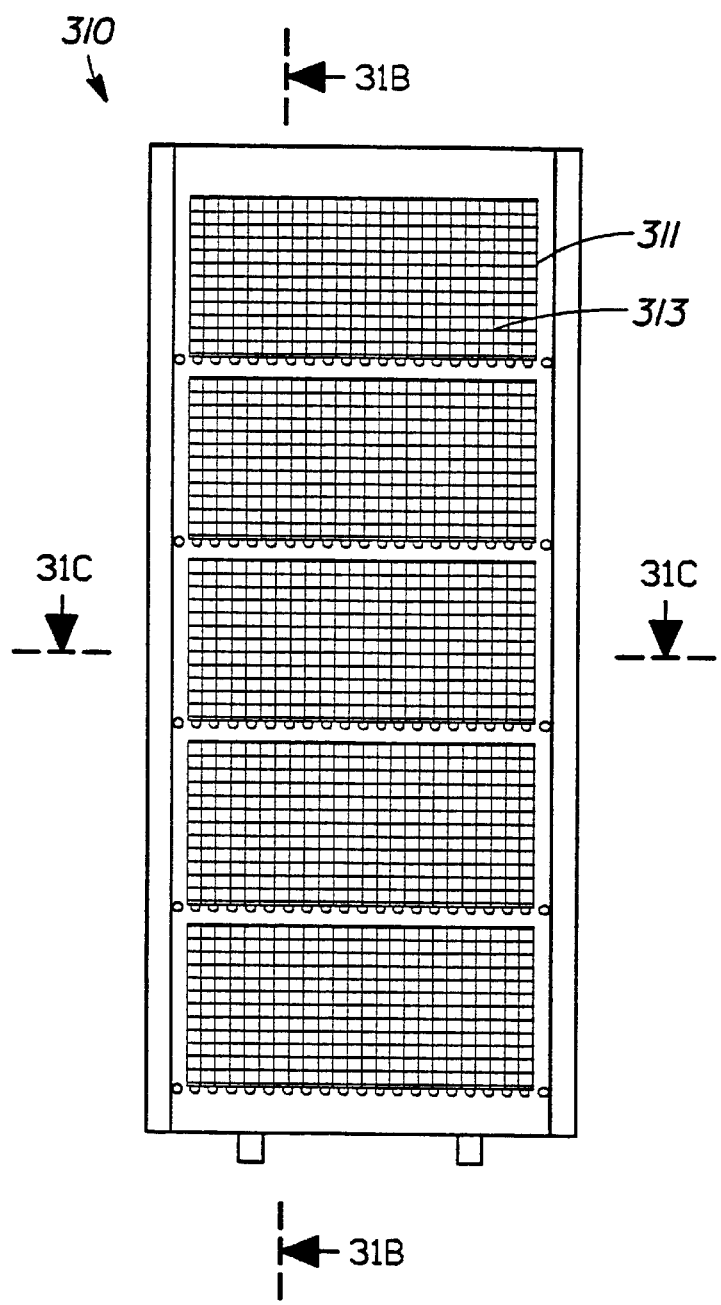
FIG. 31B
FIG. 31A
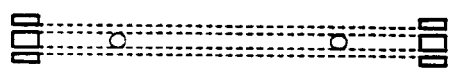
FIG. 31C

FUEL CELL SYSTEM FOR LOW PRESSURE OPERATION

This application is a divisional application of co-pending U.S. patent application Ser. No. 09/523,910, filed on Mar. 13, 2000, now U.S. Pat. No. 6,410,180, which was a divisional of U.S. application Ser. No. 08/926,547, filed Sep. 10, 1997, now U.S. Pat. No. 6,054,228, which was a continuation-in-part of U.S. application Ser. No. 08/656,968, filed Jun. 6, 1996, now U.S. Pat. No. 5,709,961.

This invention was made with government support under contract DAAL01-96-C-3609 awarded by the Department of Defense (Army). The government has certain rights in this invention.

FIELD OF THE INVENTION

This invention relates generally to the field of fuel cells. More particularly, the invention relates to low pressure fuel cells and their components.

BACKGROUND OF THE INVENTION

Generally, a fuel cell is a device which converts the energy of a chemical reaction into electricity. Fuel cells differ from batteries in that fuel and oxidant are stored external to the cell, which can generate power as long as the fuel and oxidant are supplied. A fuel cell produces an electromotive force by bringing the fuel and oxidant in contact with two suitable electrodes separated by an electrolyte. A fuel, such as hydrogen gas, is introduced at one electrode where it dissociates on the electrocatalytic surface of the positive electrode (anode) to form protons and electrons, as elucidated in equation 1. The electrons pass into the conductive structure of the electrode, and there from to the external electrical circuit energized by said fuel cell. The protons formed by dissociation of the hydrogen at the first electrode and pass through the electrolyte to the second electrode. Simultaneously, an oxidant, such as oxygen gas or air, is introduced to the second electrode where it is adsorbed on the electrocatalytic surface of the negative electrode (cathode) and is electrochemically reduced to form a surface oxide species by electrons having transversed the external electrical circuit energized by the fuel cell. This surface oxide reacts with protons from the electrolyte to form water, the product of the net reaction. The water desorbs from the electrode and leaves the cell in the cathode gas stream. The half cell reactions for a hydrogen consuming fuel cell at the two electrodes are, respectively, as follows:

$$H_2 \rightarrow 2H^+ + 2e^- \quad (1)$$

$$\tfrac{1}{2}O_2 + 2H^+ + 2e^- \rightarrow H_2O \quad (2)$$

Connecting the two electrodes through an external circuit causes an electrical current to flow in the circuit and withdraws electrical power from the cell. The overall fuel cell reaction, which is the sum of the separate half cell reactions written above, produces electrical energy and heat.

In practice, fuel cells are not operated as single units, but are connected in a series to additively combine the individual cell potentials and achieve a greater, and more useful, potential. The cells in a given series can be connected directly, with opposing faces of a single component in contact with the anode of one cell and the cathode of an adjacent cell, or through an external electrical linkage. A series of fuel cells, referred to as a fuel cell stack, are normally equipped with a manifold system for the distribution of two gases. The fuel and oxidant are directed with manifolds to the correct electrodes, and cooling is provided either by the reactants or by a cooling medium. Also within the stack are current collectors, cell-to-cell seals, and other components. The stack and associated hardware make up the fuel cell module.

In fuel cells where a solid polymer electrolyte or proton exchange membrane (APEM≅) is used, the membrane acts as the electrolyte as well as a barrier for preventing the mixing of the reactant gases. A PEM fuel cell is described in greater detail in Dhar, U.S. Pat. No. 5,242,764, which is incorporated herein by reference. Much research and development has been devoted to improving the power-to-weight ratio for proton exchange membrane (APEM≅) fuel cells. Most of this research has involved increasing the power per unit volume of relatively heavy stacks.

FIG. 1 is a drawing illustrating a fuel cell stack based on a conventional bipolar filter press design 10 with graphite structure elements. A full description of filter press type fuel cells may be found in Neidrach, U.S. Pat. No. 3,134,697 which is incorporated herein by reference. While improvements in the filter press style fuel cells have provided significant increases in power per unit volume, the overall systems that have evolved are large, heavy, and relatively complex, with compressors to supply air and pumps to provide forced water cooling systems to remove excess heat.

FIG. 2 shows the structure of a standard fuel cell membrane and electrode (M&E) assembly 20 intended for use in the bipolar stack 10 of FIG. 1, which has current collection over most of the back of the electrode. The M&E assembly consists of a membrane 22, a catalyst layer 24, a gas diffusion layer 26 and a conductive cloth backing 28. As illustrated, a complete M&E assembly includes similar layers formed on both sides of the membrane.

More recently, efforts have been made to reduce the stack weight by replacing the heavy carbon elements with thinner and lighter, metal elements. However, these units were designed for large scale applications, some on the order of about 30 kW, and, therefore, require the same stack ancillary equipment mentioned above. Furthermore, the ancillary equipment included with the stack in these systems has been designed to operate efficiently at the kilowatt level. Scaled down versions of these systems have been attempted in applications that require much less power, such as within the range between about 50 and about 150 Watts. However, these systems are not well suited for stack outputs in the tens or hundreds of watts, since the rotating components, such as pumps and compressors, do not scale down well. As a result, even small scale systems of this design are too heavy for many small applications, such as for portable applications and personal use.

Therefore, perhaps the most important objective for portable and personal applications is not Watts per unit volume but Watts per unit weight, i.e. W/lb. Efforts to adapt the standard bipolar filter press design to low pressure operation, thereby eliminating much of the ancillary equipment, have met with some limited success, producing stacks with power densities as high as 61 W/lb. While this is a useful power density, these systems require complicated and expensive assembly.

One possible way of improving fuel cell systems for operation at lower pressures is using liquid fuels in lieu of gaseous fuels, such as hydrogen. Methanol ($CH_3OH$) and other related compounds, such as dimethoxymethane ($C_3H_8O_2$) and trimethoxymethane ($C_4H_{10}O_3$), offer very promising alternatives to gaseous fuels.

The liquid fuels mentioned above share some common advantages compared to hydrogen. First, they are all pourable liquids at ambient pressure and ambient, and near ambient, temperatures. Second, they have a much higher energy density than hydrogen. For example, a 1:1 methanol:water mixture (each mole of methanol requires a mole of water for electrochemical oxidation, as shown in Equation 3) has as much potential energy as hydrogen stored at a pressure of 16,000 psi.

$$CH_3OH+H_2O+\tfrac{3}{2}O_2 \rightarrow CO_2+3H_2O \quad (3)$$

Although there is a net production of water, e.g., more water is produced at the cathode than consumed at the anode, water must be supplied to the anode because in a fuel cell the oxidation is carried out as a pair of half cell reactions, with Equation 3 representing the net reaction. In a fuel cell water is consumed in the anode reaction (Equation 4) and produced in the cathode reaction (Equation 5).

$$CH_3OH+H_2O \rightarrow CO_2+6H^++6\ e^- \quad (4)$$

$$6H^++6e^-+\tfrac{3}{2}O_2 \rightarrow 3H_2O \quad (5)$$

The reactions for dimethoxymethane and trimethoxymethane are similar, with four and five molecules of water needed for each molecule of the oxidized organic compound respectively. Since they are consumed at higher water-to-fuel stoichiometries, the two ethers should be present at lower concentrations in the fuel stream, and consequently have lower permeation rates through PEM membranes and lower vapor pressures over the solution. This is especially true in the case of trimethoxymethane, which has a boiling point of 104° C., 40° C. higher than methanol, and consequently, a lower vapor pressure than methanol under all conditions. The lower vapor pressure, combined with lower toxicity for these compounds, leads to less vapor toxicity hazards compared to those associated with the use of methanol.

Therefore, there is a need for a lightweight fuel cell system that provides an improved power density (W/lb) and eliminates much of the ancillary equipment. There is also a need for fuel cells that operate on gaseous fuels, such as hydrogen, and fuel cells that operate on liquid fuels, such as dimethoxymethane. It would be desirable if the fuel cell operated efficiently in the 50 to 150 Watt range to supply electricity to a variety of common electrical devices. It Would also be desirable if the fuel cell had no more than a few moving parts to reduce maintenance and avoid breakdowns. It would be further desirable to have a fuel cell system that was available in modules that could be configured together to meet the power requirements of specific applications.

SUMMARY OF THE INVENTION

The present invention provides an apparatus comprising an array of cells. Each cell comprises a membrane, an anode comprising a conductive element, and a cathode comprising a conductive element. The cathode of one cell shares its conductive element with the anode of an adjacent cell; the sharing of conductive elements establishing an electrical connection between the cells in the array. In one embodiment the cells are electrochemical cells suitable for the direct production of electricity through the simultaneous oxidation of a fuel, or reducing agent, at one electrode, the anode, accompanied by simultaneous reduction of an oxidizer at the other electrode, the cathode. In another embodiment, the cells can be used to produce oxidized and/or reduced products through simultaneous electrochemical oxidation at one electrode and reduction at the opposing electrode of a compound or a mixture of compounds by application of an electrical current. Further, the invention provides for the use of both gas and liquid feeds.

The invention also encompasses a low pressure gas electrode comprising (a) an electrically conducting supporting substrate; wherein said substrate comprises at least two opposite faces; a plurality of openings allowing passage from one face to an opposite face; said openings encompassing between about 10% and about 90% of the total area of the substrate; and (b) an electrically conductive porous material bound to the substrate comprised of a conductive component and a binding component. In one embodiment, the conductive porous material is a mixture comprising a powdered component and a fibrous component. In yet another embodiment, the powdered and/or fibrous components comprise carbon.

BRIEF DESCRIPTION OF THE DRAWINGS

So that the above recited features and advantages the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 13(a) is a drawing showing a wrap-around fuel cell stack supported on its fuel supply, illustrated here as a cylinder with series of square window panes on the surface of the cylinder.

FIG. 13(b) is a drawing showing a wrap-around fuel cell stack supported on its fuel supply, illustrated here as a cylinder with a series of bands, with long, narrow individual cells.

FIG. 14 is a cross-sectional view of a monopolar fuel cell mounted on the outside of the vessel that supplies its fuel.

FIG. 31(a) is a face on view into the cathodes on one face of a fin.

FIG. 31(b) is a cross-sectional view cut vertically near the center of FIG. 31(a), showing an embodiment of a dual electrode structure.

FIG. 31(c) is a cross-sectional view cut horizontally near the center of FIG. 31(a).

DETAILED DESCRIPTION OF THE PREFERRED EMBODIMENT

Figure 1:
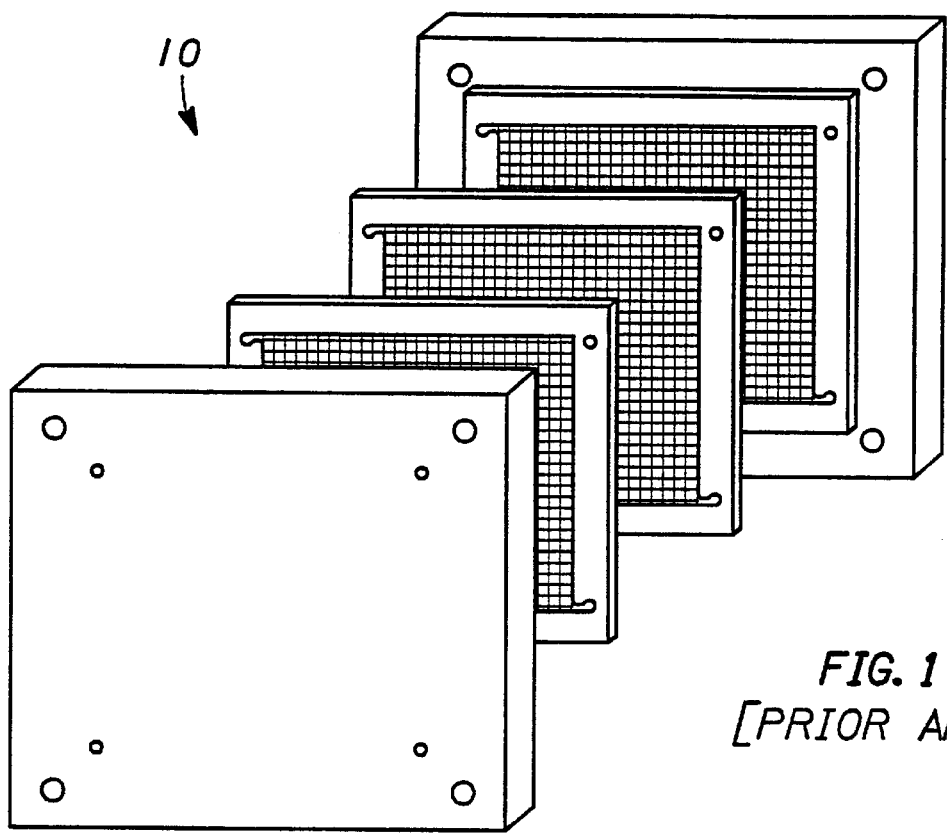
FIG. 1 is a standard filter press type fuel cell stack 10 showing the arrangement of the bipolar cell plates and end plates.

The present invention provides an apparatus that is useful in electrochemical cells, especially those useful for generating electricity known as fuel cells. More particularly, the invention provides various electrode structures or configurations that provide increased power output per unit weight of the cell. The electrodes may be used with gaseous fuels, such as hydrogen, or liquid fuels, such as methanol. The electrodes are designed to operate even at low fuel and oxidant pressures.

One aspect of the invention provides an electrically conductive member disposed within the electrode, rather than having a conductive cloth layer and a conductive frame disposed along a perimeter face of the electrode. The electrically conductive member may be a sheet of expanded metal mesh or wire, preferably expanded metal mesh. The expanded metal mesh or other electrically conductive member preferably has a greater portion of open area than does carbon cloth or paper to increase the gas flow to and from the catalyst areas.

Another aspect of the invention provides a wicking member for delivering a liquid fuel to the anode side of the fuel cell or to the electrochemical cell. The liquid fuel may be mixed with various concentrations of water as necessary to the facilitate the electrode reactions and provide water to the proton exchange membranes.

A further aspect of the invention provides a cooling member disposed between adjacent cells. While cooling may be accomplished by external air circulation, either natural or forced, this is sometimes inadequate, and it is sometimes advantageous to add a cooling member. The preferred cooling members of the invention comprise air channels disposed between fuel feed ports in the anode compartment. The channels may be as simple as a pair of walls with an opening therebetween or the channel may contain one or more heat transfer members.

The present invention provides a lightweight fuel cell system that operates with fuel and oxidant gases at near atmospheric pressures. The fuel cell system uses a monopolar cell design where the electrode surfaces are sufficiently accessible to the gases that it is not necessary for the oxidizer and reducer gases to be compressed. The fuel cell is ideal for personal use due to its light weight, compact size and self contained operation. An added feature of the present invention is that individual fuel cells may be linked together to achieve greater voltages or currents.

The present invention provides a monopolar fuel cell system based on the use of flat cell frames that support the cell components. A monopolar design is lighter than a bipolar or filter press design for a number of reasons. First, since the monopolar fuel cell is not under compression, the components, such as the cell frames, can be much thinner than the structure of a bipolar fuel cell which relies on the thickness of the components to maintain precise spacings for gas flow therethrough. The primary limitation on the thickness of the components is that the component in question must have sufficient strength to maintain its integrity during use in various applications. This permits the use of a wide variety of lightweight conductive materials, such as a thin titanium sheet.

Another reason that the monopolar fuel cell of the present invention weighs less than conventional systems, is that many components of a conventional system are no longer necessary and may be eliminated entirely. For example, the preferred monopolar fuel cell uses ambient air as the oxidizer, rather than compressed air or oxygen, as the oxidizer. Because it is unnecessary to compress the oxidizer, the conventional gas control system is unnecessary and may be eliminated. Instead, the gas is supplied to the cathode by either free or forced convection. In either case, there is no need for an enclosed cathode flow field.

In addition, the bipolar plates of conventional fuel cells, which separate anode and cathode flow fields and conduct current from one cell to the next, are no longer needed and may be eliminated. The plates are not needed to separate flow fields because the anode and cathode flow fields of the present invention are open to the sealed reducing gas chamber and the atmosphere, respectively, and are effectively separated by the cells themselves. Furthermore, the bipolar plates are not needed to conduct electrical current from one cell to the next since this function is performed by a different electrically conducting member, such as an external bipolar frame or an internal bipolar grid.

Another component or system of conventional fuel cell systems that is no longer required is the heat transfer system. The fuel cell system of this invention has a much larger ratio of exposed area to active area and, therefore, dissipates waste heat directly to the surrounding air without the need for a circulating heat transfer fluid, a pump to circulate the fluid, or heat exchangers inside the stack to collect the heat and outside the stack to dissipate the heat. However, in some applications, it may still be desirable to include a cooling member such as an air channel made from a material having a high thermal conductivity.

Eliminating moving parts from fuel gas systems, in accordance with the present invention, eliminates the parasitic power losses required to drive the motors involved and the potential for malfunctions. Furthermore, eliminating small motors and moving parts in fuel gas systems reduces maintenance and malfunctions, particularly in applications where the system is portable.

Another advantage of monopolar fuel cell systems is the low cost of manufacture. Because the entire stack is assembled from a series of flat, or nearly flat, components, all of the parts can be cut from flat sheets. No complex machining steps are required.

Electrochemical Cells Having External Bipolar Frames

The membrane and electrode assemblies used in the present invention are comprised of a proton exchange membrane (APEM≅), catalyst layers on either side of the PEM, and gas diffusion layers over the catalyst layers. Gas diffusion electrodes, their construction and fabrication, are generally described in Murphy et al., U.S. Pat. No. 5,460,705 which is hereby incorporated by reference. The preferred PEM is generally a polymer material having sulfonate functional groups contained on a fluorinated carbon backbone, such as the perfluorinated sulfonic acid polymers available under the trade name NAFION from Du Pont de Nemours, E. I. & Co of Wilmington, Del. The gas diffusion layers preferably comprise a carbon conducting paper or cloth. In one preferred embodiment, a platinum catalyst is supported on the carbon paper before hot pressing with the PEM. However, it is also anticipated that the same general construction can be achieved using thin film electrodes, where the catalyst is deposited directly onto the PEM rather than the carbon paper.

It is preferred that the reducing gas be delivered to the anodes from a supply vessel through a pressure regulating feed valve and feed line connected to the reducing gas chamber. The anode surface of each individual cell is directly exposed to the reducing gas in the chamber and does not require enclosed anode flow fields for delivery of the reducing gas. Since the reducing gas chamber allows the reducing gas to flow freely over the anode surface, it is not necessary to compress the reducing gas for delivery through narrow passages or flow fields. Therefore, the reducing gas may be supplied at any pressure. However, it should be noted that while the fuel cell does not require the reducing gas, such as hydrogen, to be pressurized, it is generally preferred that the hydrogen is stored in a pressurized vessel that can be transported along with the fuel cell itself. It is further preferred that the pressurized hydrogen be delivered from the vessel to the reducing gas chamber through a step-down regulator to a pressure generally less than about one atmosphere above ambient pressure, but most preferably less than about 2 psig to avoid displacing the membrane and electrode assemblies out of their frames.

The fuel cell consumes the fuel at the anode, produces water at the cathode and generates a flow of electricity for use in various applications. The water that is generated at the cathode is useful to keep the PEM moist so that it will conduct protons efficiently. Water will evaporate from the cathode surface into the air and provide some cooling to the cells. However, because there is no external source of water to the PEM, the air flow rate and temperature should not be allowed to dry out the PEM.

In one aspect of the invention, it is possible to fabricate the cells with the same catalyst, preferably platinum (Pt) or a platinum-containing alloy, and the same catalyst loading on both the anode and the cathode. Therefore, the cells may be cut, handled and fabricated without regard for their orientation. This may be advantageous in some applications, since the anode and cathode cannot be distinguished by appearance alone. On the other hand, because Pt has greater catalytic activity for hydrogen gas than for oxygen gas, a cell with better precious metal utilization is obtained when the platinum loading is lower on the anode than on the cathode.

The sheets and other components of the present invention may be assembled and coupled in many different ways and with many different means as will be recognized in the art. In particular, it should be recognized that the components may be fastened with mechanical fasteners, such as bolts, screws, clamps, straps, rivets and the like, adhesives, and welding of the components. However, it is most preferred that all of the components be fastened using adhesives and welding, so that a minimal amount of material is added to the fuel cell and a minimal number of parts are needed. Bonding processes are also generally preferred since this type of assembly can easily be automated.

Figure 3:
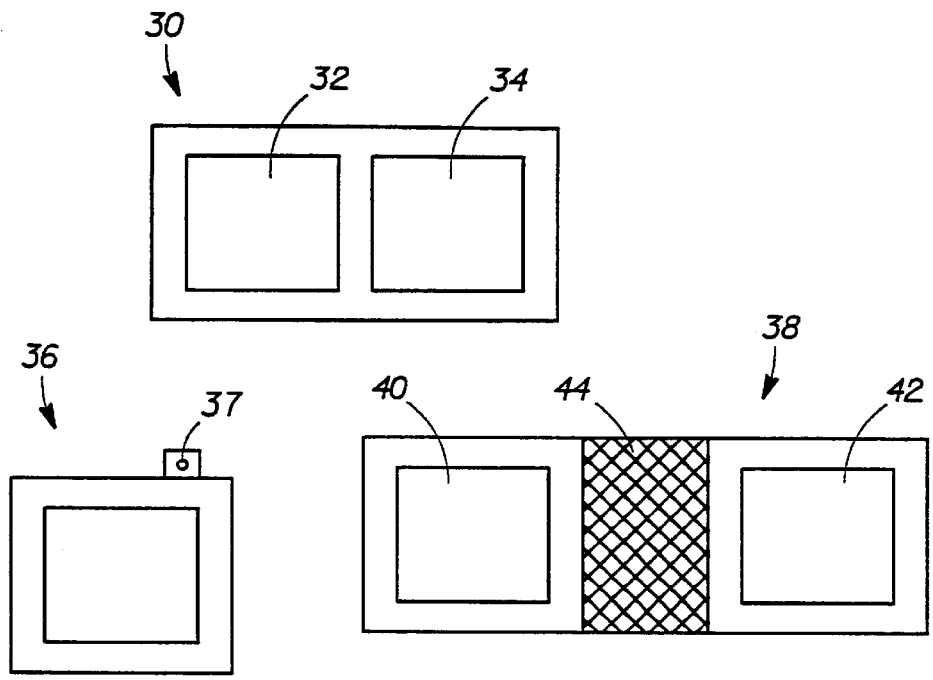
FIG. 3 illustrates the key components for a monopolar cell stack, including a terminal cell frame 36, a flat bipolar cell frame 30 and a curved bipolar cell frame 38.
Figure 4:
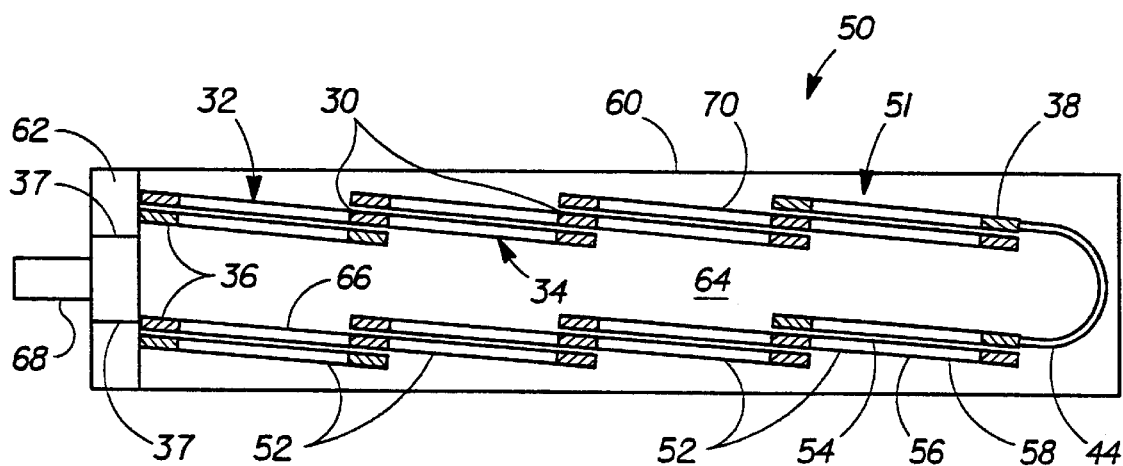
FIG. 4 is a cross-sectional view of a fuel cell stack 50 comprised of monopolar cells based on the use of the bipolar cell frame components of FIG. 3.

Now referring to FIG. 3, a face view of three types of cell frame components are shown. First, there is the dual cell frame 30 which has openings 32, 34 for exposing two M&E assemblies. The dual cell frames 30 are overlapped (as shown in FIG. 4) so that the opening 32 of a first frame 30 coincides with the opening 34 of an adjacent frame 30. The two metal frames 30 hold the M&E assemblies firmly around the edge of the assembly.

Figure 2:
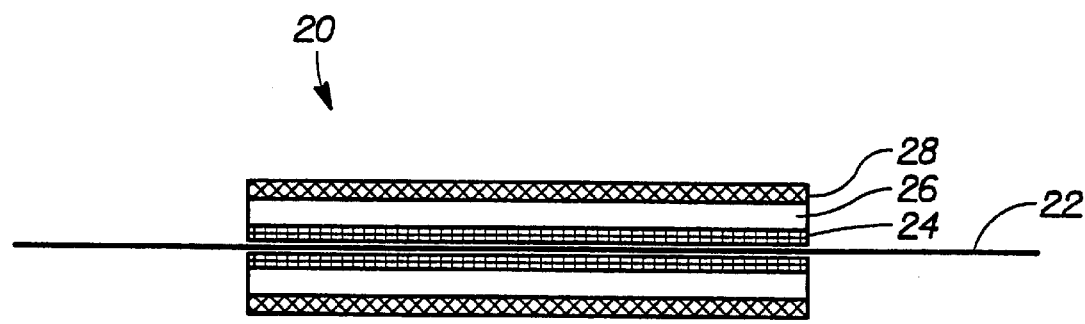
FIG. 2 is a cross-sectional view of a standard PEM fuel cell membrane and electrode assembly (M&E) 20.

Now referring to FIG. 4, a top cross-sectional view of a fuel cell stack 50 is shown. The overlapping dual cell frames 30 can be repeated any number of times to form the multi-cell stack or fin 51. At the end of the series of cells, a terminal cell frame 36 may be used to overlap one of the openings 32, 34 and also to provide an electrical contact 37 for conducting electricity to and from the stack. The curved dual cell frame 38 has two openings 40, 42 like the dual cell frame 30, except that it has an enlarged central region 44 which can be curved to form the distal end of a fin 51. The fin 51 can have any number of cells 52, but is shown here having eight cells connected in series. In a fashion similar to the M&E assembly of FIG. 2, the cells 52 have an M&E assembly comprised of a central PEM 54, a catalyst coating 56 and gas diffusion layer 58.

Side plates 60 are sealed to the top and bottom edges of the fin 51 and an end cap 62 is sealed to the open end of the fin 51. The plates 60 and cap 62, in cooperation with the fin 51, form a chamber 64 in communication with all of the anode surfaces 66. A gas inlet port 68 is provided in the end cap 62 for the introduction of the chamber 64.

The two-sided arrangement shown in FIG. 4 represents a preferred embodiment of the invention. This arrangement permits the largest number of cells to share a common internal fuel gas chamber. It is also possible to arrange the series of cells as a flat strip, where the opposing surface of the internal chamber is an inactive surface. While generally less efficient in terms of weight or volume, in some applications, this may be a preferable arrangement.

The preferred fuel is a reducing gas, with the most preferred gas being hydrogen. In operation, each of the individual cells of the fuel cell 50 has a cathode surface 70 that is exposed to the air as the oxidizing gas. Therefore, the fuel cell 50 operates at low pressures and without any moving parts. The cell is also lightweight, easy to manufacture and relatively inexpensive.

Unlike a conventional bipolar system, this fuel cell collects the current only from the edges of the electrode, leaving the entire face open. Leaving the area of the electrode as open as possible reduces the potential for interference with diffusion and facilitates the supply of air under ambient conditions without the need for a compressor or other high powered air moving device.

Figure 5:
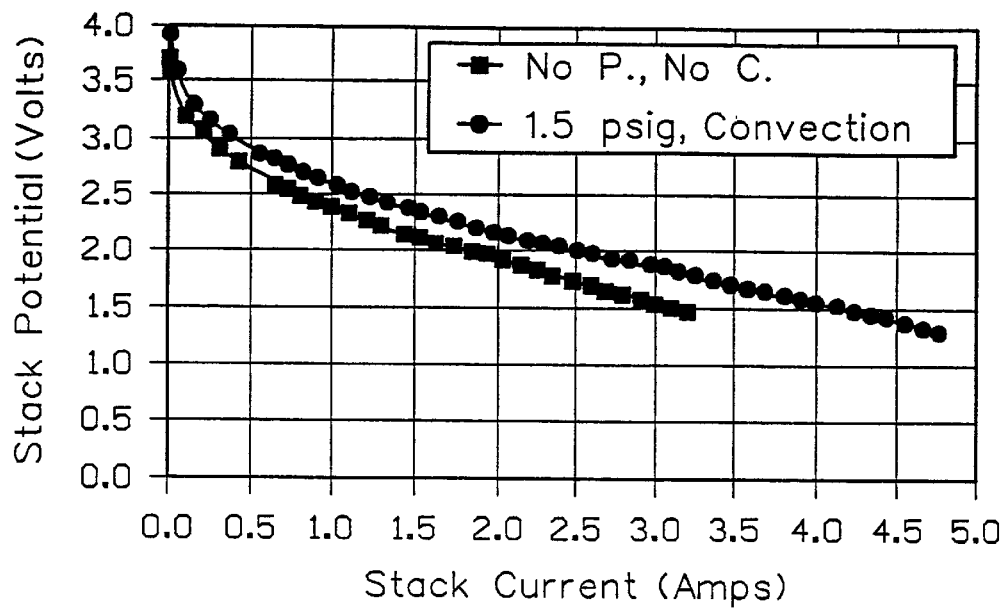
FIG. 5 is a graph showing the effect of both increased fuel pressure and forced convection on the performance of a four cell fuel cell stack.

A four cell version of fuel cell 50 of the present invention was constructed and operated using hydrogen gas as the fuel and ambient air as the oxidizer. The performance of the fuel cell is illustrated in FIG. 5 by a graph of stack potential (Volts) as a function of stack current (Amps). As is apparent from the data displayed in that figure, increasing the fuel pressure slightly (1.5 psig) and using a small fan to create a forced convection flow over the stack produced a marked improvement in the stacks performance.

Figure 6A:
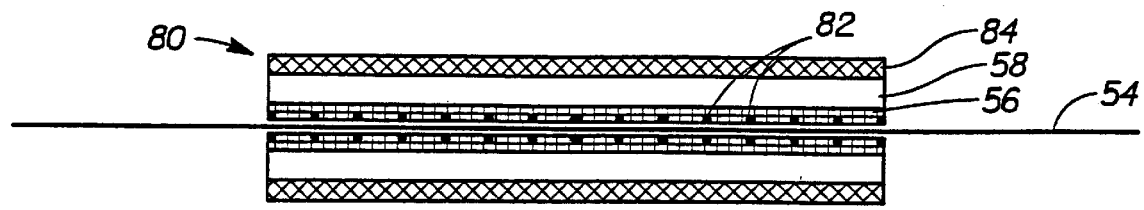
FIGS. 6(a–c) are cross-sectional views of three configurations for an M&E produced with a metal conductive element (grid) 82 included as part of the structure.

Now referring to FIGS. 6(a–c), the structures of three different M&E assemblies specifically intended for use in a monopolar fuel cell are shown. In the configuration of FIG. 6(a), a metal grid 82 is embedded in the front surface of the electrode 80 and in direct contact with both the electrocatalytically catalyst coating 56 of the electrode and the membrane 54. The advantage of this arrangement is good electrical contact with the electrocatalyst for efficient current collection and the least interference with gas diffusion within the electrode. The disadvantages are the difficulty in making good electrical contact between the dual cell frame 30 and both the metal grid 82 and the conductive carbon cloth 84 at the back of the electrode, the potential for damaging the membrane 54 with the grid while attaching the electrode by hot pressing and a loss of area for the interface between the electrocatalyst and the membrane. Although the latter can be partly compensated for by appropriate impregnation of the electrode with a NAFION solution, the long diffusion path for protons around the grid through the recast membrane leads to relatively high local resistances.

Figure 6B:
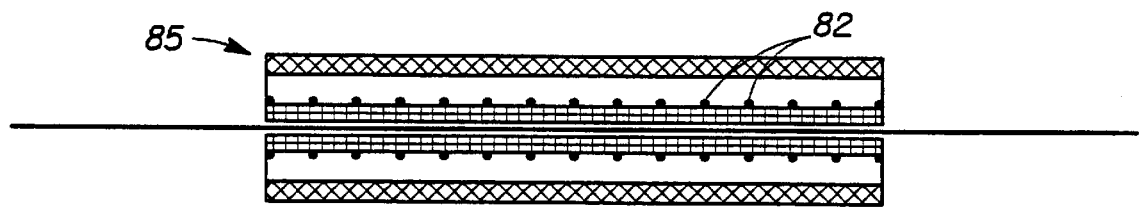

FIG. 6(b) shows an M&E configuration 85 with the metal grid 82 in the center of the electrode, between the uncatalyzed carbon gas diffusion layer 58 and the catalyst coating 56. The advantages of this configuration are good contact between the grid 82 and the electrocatalyst 56 for efficient current collection and no blockage of the interface between the membrane 54 and the active electrocatalyst 56. The disadvantages of this configuration are a more difficult fabrication procedure and possible interference with gas diffusion inside the electrode.

Figure 6C:
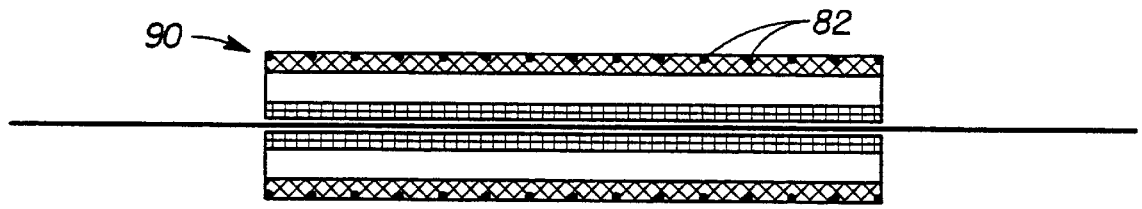

FIG. 6(c) shows an M&E configuration 90 with the grid 82 on the back side of the electrode. The advantages of this configuration are good contact between the grid 82 and the cell frame 30 (see FIG. 4) for efficient current collection, no blockage of the interface between the membrane and the active electrocatalyst, and simpler fabrication than the arrangement with the grid inside the electrode. The disadvantages of this arrangement are the creation of vertices on the outer face of the electrode which can act as anchors for water drops leading to a loss in available area for gas diffusion and the difficulty of insuring that the grid will stay in contact with the electrode for an indefinite period of time.

Electrochemical Cells with Internal Bipolar Electrically Conducting Member

One aspect of the invention provides an electrically conductive member disposed within the electrode, rather than having a conductive cloth layer and a conductive frame disposed along a perimeter face of the electrode. The electrically conductive member may be a sheet of expanded metal mesh or wire, preferably expanded metal mesh. The expanded metal mesh or other electrically conductive member preferably has a greater portion of open area than does carbon cloth or paper to increase the gas flow to and from the catalyst areas.

Figure 30A:
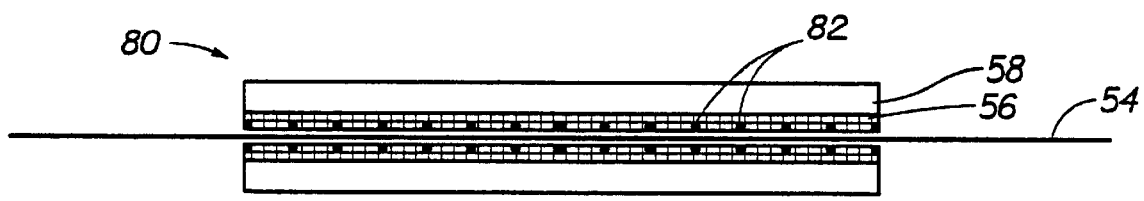
FIGS. 30(a–b) are cross-sectional views of two configurations for an M&E produced with a metal conductive element included as part of the structure.
Figure 30B:
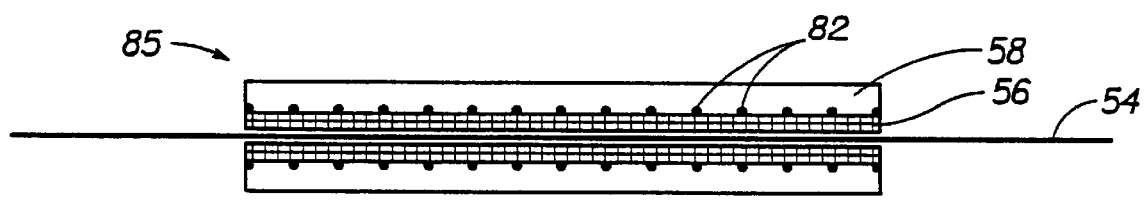

Now referring to FIGS. 30(a–b), the structures of two different M&E assemblies specifically intended for use in a stack of monopolar fuel cells wherein the internal electrically conductive element 82 of the anode in one cell extends and forms the conducting element in the cathode of an adjacent cell.

The difference between the M&E configurations of FIGS. 30(a–b) and those of FIGS. 6(a–b) respectively is the elimination of the conductive carbon cloth 84 shown at the back of the electrodes in FIGS. 6(a–b).

The metal grids of FIGS. 30(a–b) provide the support normally provided by the carbon cloth or carbon paper in conventional gas diffusion electrodes while adding in-plane conductivity to the electrode. Since the metal grid is quite close to the membrane in this design, it is imperative that the metal not corrode. Corrosion will not only increase the contact resistance between the active portion of the electrode and the current collecting frame, but mobile metal ions coming in contact with the membrane may replace protons in the membrane. Replacing even a small fraction of the protons in the membrane with far less mobile metal ions will lead to a significant drop in membrane conductivity. This factor imposes a requirement that the grids have low contact resistance and be corrosion resistant. The best way to impart these properties to a piece of lightweight material is to plate the metal with a layer of a more precious metal, such as gold, platinum, palladium, or ruthenium, to protect it from corrosion and to improve electrical contacts.

Another advantage to fabricating electrodes with an internal conductive element so long as the conductivity of the resultant electrode is sufficient, is that the bipolar cell frame described above is no longer needed for consecutively connecting the cells. Eliminating the cell frame leads to a smaller and lighter stack.

Figure 7:
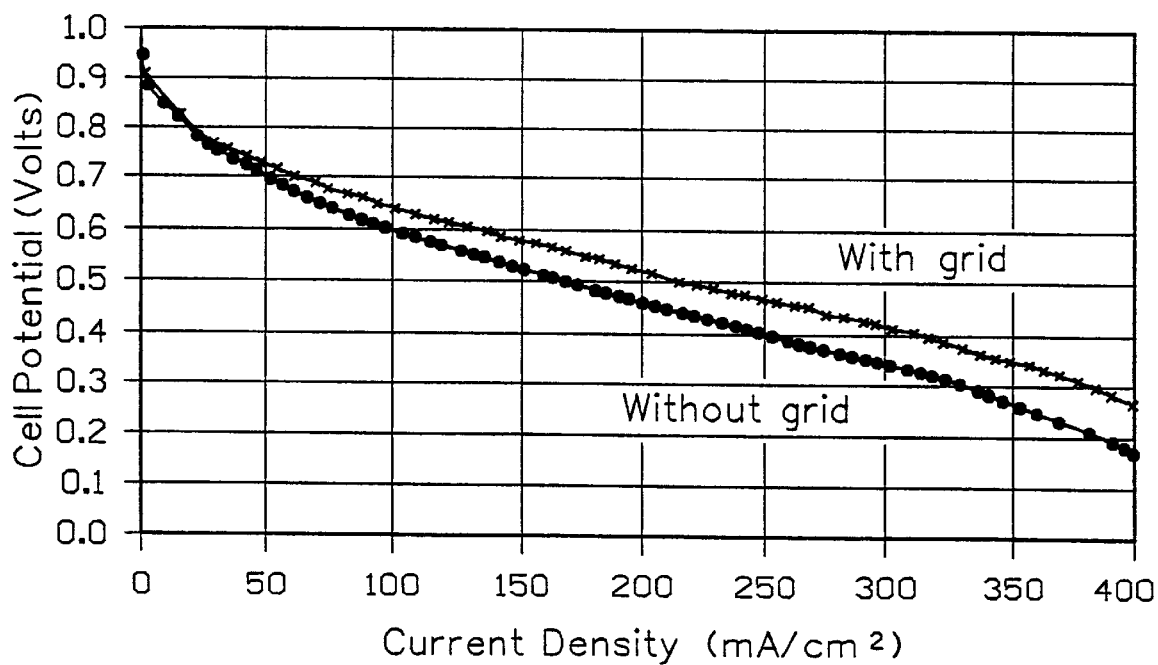
FIG. 7 is a graph showing the improvement in performance produced by attaching a metal grid to the back of the electrode.

FIG. 7 shows the improvement in monopolar fuel cell performance produced by the inclusion of a metal grid on the back of the electrode. The configuration 90 of FIG. 6(c), with the grid on the back side of the electrode, gave the best performance of the three designs in FIGS. 6(a–c).

Figure 8:
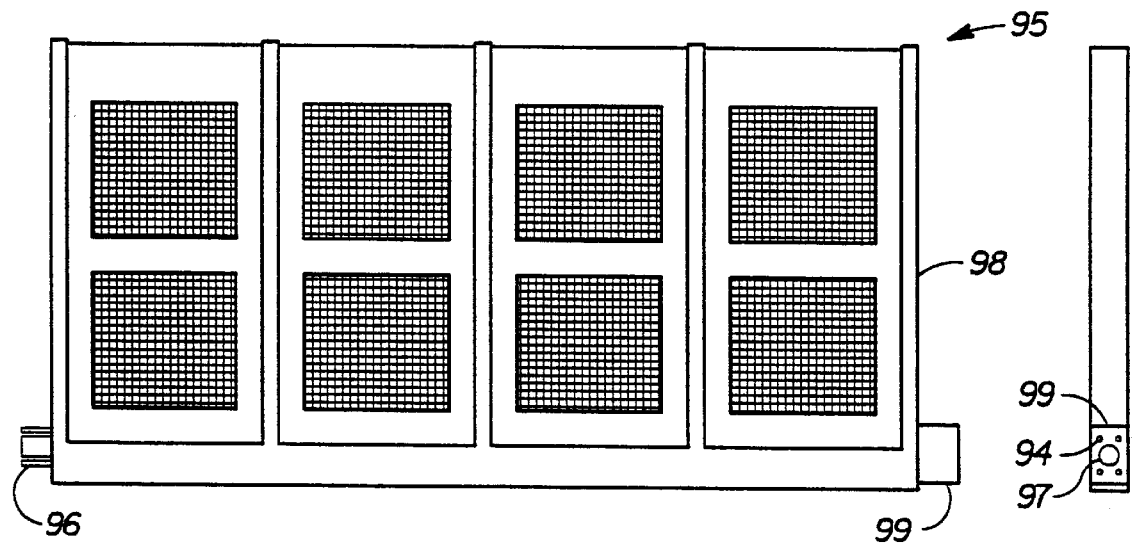
FIG. 8 is an exemplary monopolar fuel cell stack 95.

FIG. 8 shows a module design 95 that would stack head-to-tail (end 96 of one module to end 98 of another module) using a combined plug 99 with four electrical connections 94 and a gas connection 97. Inside the module, terminal ends of the cells are electrically connected into groups, each of which will supply power at a potential of 12 Volts (the minimum output that a power system may have for many applications). The mating plug on the item being powered (not shown) can be wired to utilize the groups in parallel for 12 Volts, or in series for 24 Volts. As many modules 95 as desired can be connected together to increase the current available, but the voltage will remain constant at either 12 or 24 Volts. It is anticipated that the modules could be stacked side-by-side or end-to-end and operate equally well.

The present invention provides an open fin design that produces a very light fuel cell system. The power-to-weight ratio for the fins alone (no fittings) has been shown to be as high as 220 W/lb. When the weight of the fittings needed to connect the stack to the fuel supply and the next module are included, this drops to a still impressive 180 W/lb. While this is the lightest arrangement, this design is only practical for enclosed applications because the lightweight construction leaves the cell subject to damage.

Figure 9:
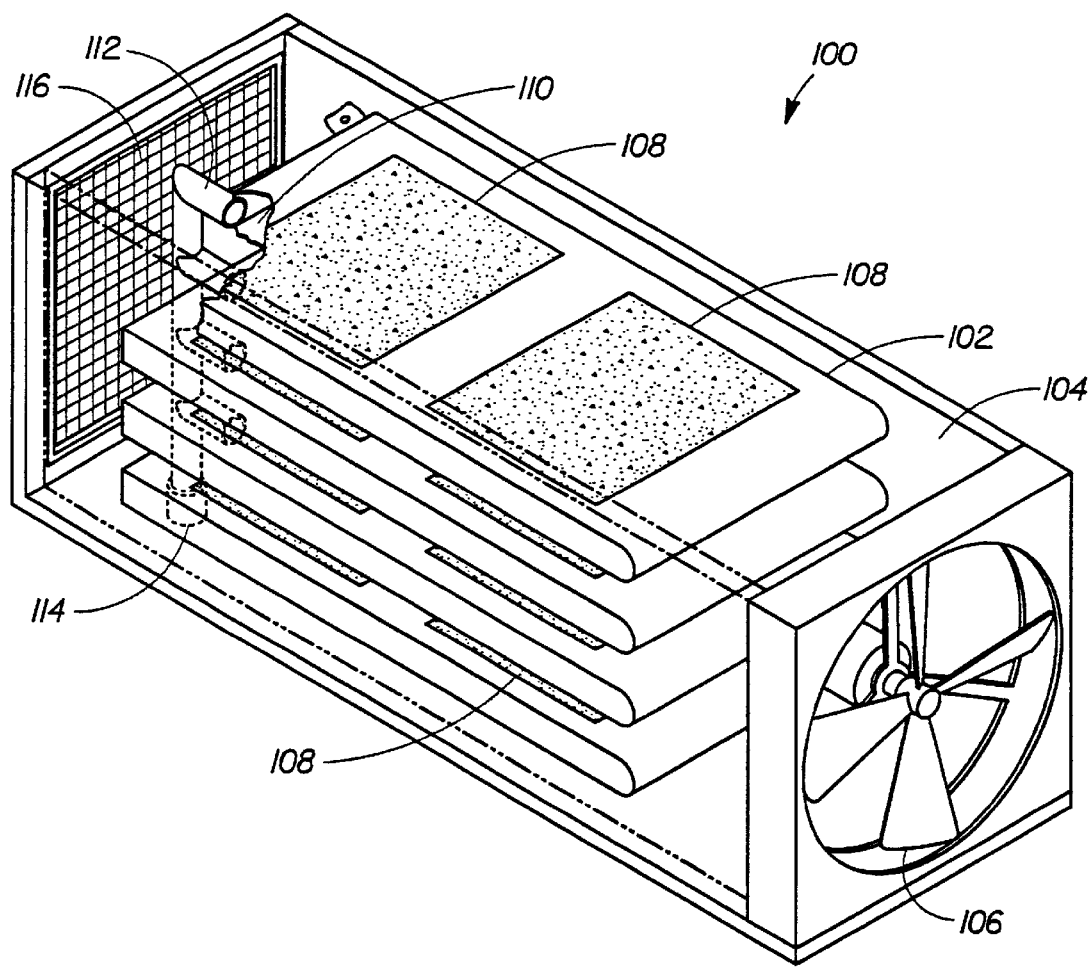
FIG. 9 is a perspective view of a compact fuel cell 100 having a fan 106 to provide forced convention of air over the cathodes 108.

FIG. 9 shows an even more compact and useful fuel cell configuration 100. In this arrangement a plurality of fins 102 are enclosed in a common housing or shell 104, with a small fan 106 located at one end to move a continuous stream of air over the cathodes 108. With 4 mm thick fins, a fin-to-fin spacing of 2–3 mm would be required, or about 4 fins per inch. This arrangement produces a projected stack volume of about 335 ml for a module sized to produce about 50 Watts of power. It is likely that this volume can be reduced further, with a volume below about 300 ml possible.

The fuel is delivered to each anode chamber 110 through a manifold 112, preferably located at the rear of the fins. A fuel source, such as a pressurized hydrogen tank and step-down pressure regulator (not shown), is connected to the coupling 114 on the manifold. With hydrogen in communication with the anodes and air passing over the cathodes 108 and out the back grill 116 of the housing 104, the fuel cell 100 will generate electricity for use in any 12 or 24 Volt DC application.

The addition of the fan 106 and the shell 104 increase the weight of the system 100 slightly, thereby reducing the power/weight ratio to about 150 W/lb for a 50 Watt module. Although the fuel cell 100 represents an increase in the amount of weight needed for any specified power output, the fuel cell is still quite light and the smaller size makes the cell much more portable and easy to carry.

The light weight fuel cell design of the present invention is suitable for use with gaseous fuels, such as hydrogen, or with liquid fuels, such as methanol, dimethoxymethane, or trimethoxymethane.

Both of these systems, as shown in FIGS. 8 and 9, are drawn as hydrogen fuel cells, with the gas being supplied through a feed line 94. This technology can be used with liquid fuels as well. In the case of liquid fuels, the water-alcohol mixture consumed by the fuel cell would be supplied using the same common manifold fuel distribution approach as shown for hydrogen. Attitude independence, easily achieved in a gas fueled system, can be achieved in a liquid fueled system through the use of a wicking system to feed the anodes by using capillary action to lift the fluid from the bottom of a liquid fuel container (not shown), where ever it may reside.

Figure 10:
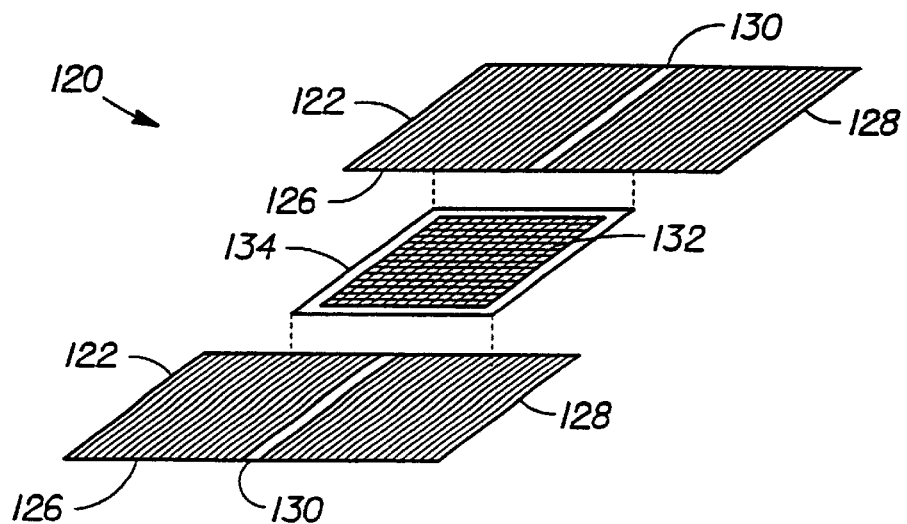
FIG. 10 is an illustration of the components of a monopolar fuel cell constructed without cell frames that may be used in an embodiment of a dual electrode structure.

FIG. 10 is an exploded view of a subassembly 120 including a pair of gas diffusion electrodes 122 fabricated with internal bipolar conductive metal grids, made in accordance with FIG. 6(b), which may be used in an embodiment of a dual electrode structure The electrodes 122 each comprise an active cathodic catalyst region 126, an active anodic catalyst region 128 and a gas barrier 130 disposed therebetween. A proton exchange membrane 132, preferably having a PTFE frame 134 is disposed between the cathodic region of one electrode and the anoclic region of another electrode. While each active catalytic region is shown as having the catalyst deposited on one surface of the gas diffusion matrix, it is also possible to deposit a thin layer electrode on the surface of the membrane. En the Conner situation, one surface of the gas diffusion electrode is catalyzed on one side of the gas barrier and the opposite surface is catalyzed on the other side. In the latter case, the diffusion backing is bonded to the back of the electrode, and the gas diffusion matrix can be fabricated as a symmetrical unit, i.e., it is not necessary to deposit catalyst on either side thereof.

In either case, the electrodes are assembled with a PEM membrane between them and a PTFE "window frame" gasket included to eliminate the possibility of electrodes shorting at the edge due to physical contact of the anode 128 and cathode 126. In this geometry each grid has both an anode and a cathode bonded to it and serves as the bipolar link between them. This eliminates the need for the bipolar cell frames. In this design the conductive elements within the electrodes serve as the bipolar elements connecting each pair of adjacent cells. PTFE frames are included to prevent shorting from electrode to electrode at the edge.

The gas barrier strip 130 disposed down the center of the conductive metal grid can be fabricated in a variety of ways. A polymer strip can be deposited using a self curing polymer, such as silicones, epoxies, and urethanes; a thermoplastic; or easily melted metals, such as solder. The barrier can also be produced as part of the grid fabrication process with the gas barrier strip 130 comprising a region of unexpanded metal. It can be readily appreciated by those skilled in the art that other methods may be used in producing light weight fuel cells, such methods are considered to be within the scope of the present invention.

Also, a wide variety of materials may be suitable for use as the conductive metal element within the gas diffusion electrode. Those described here are only examples, the use of materials not described here is within the scope of the present invention. The preferred material for the conductive element is expanded metal, a product fabricated by piercing and stretching a sheet of metal or metallic foil. For optimal performance, the metal should be flattened after expansion to restore it to its original thickness.

Figure 11:
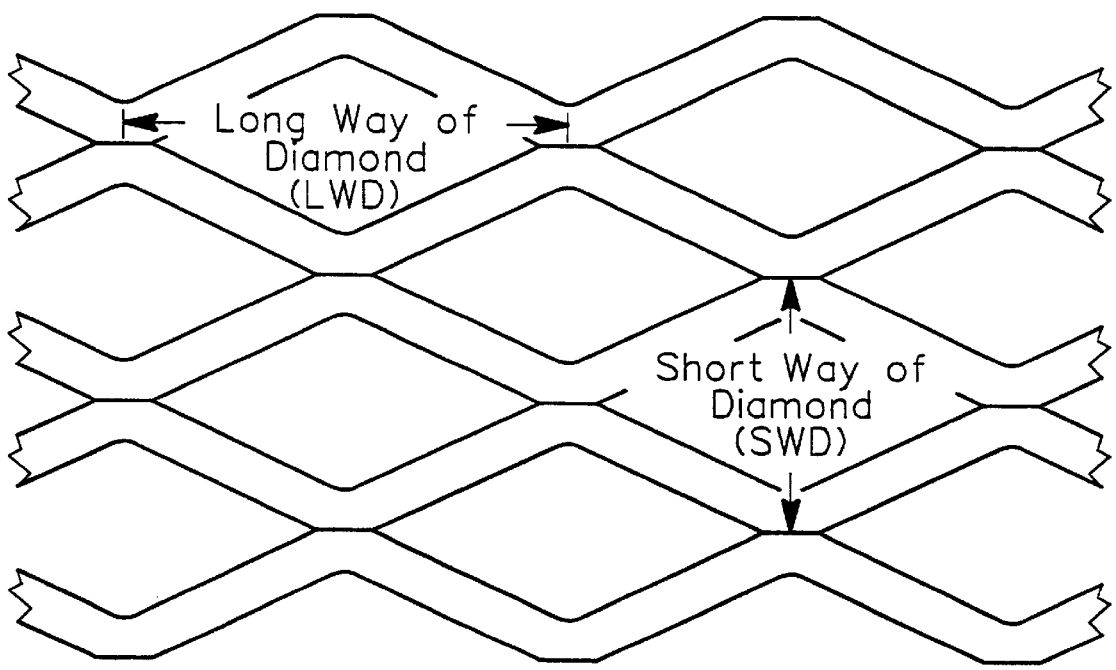
FIG. 11 is an expanded metal sheet suitable for use as the conductive element in the electrodes, and may be used as the shared conductive substrate in a dual electrode structure.

FIG. 11 shows the basic form of the expanded metal sheet used in conjunction with this invention. This expanded metal sheet is suitable for use as the conductive element in the electrodes, and is exemplary of the shared conductive substrate in a dual electrode structure. Expanded metal foils with the pattern shown as well as others are available from a wide variety of manufacturers, in a wide range of thickness, from 0.003" (0.076 mm) to 0.1" (2.5 mm) or more and manufactured from a variety of metals, including, but not limited to, titanium, nickel, copper, stainless steel, aluminum, and niobium. They are available with open areas (the percentage of the sheet area comprised of the holes) ranging from 10% to 70%. A typical expanded metal sheet has two primary directions. For best performance, the expanded metal sheet should be oriented such that the current flows in the direction parallel to the "long way" of the diamond, since the electrical resistance is lowest in this direction, as shown in Table I, which contains some properties of typical expanded metals and other materials useful for forming the conductive portion of the electrode structures, as taught here. Some of the materials in this table were gold plated prior electrical measurements so that contact resistance is reduced.

inclusion of conductive carbon fibers in the gas diffusion matrix improves the matrix's ability to span the large gaps in the expanded metal, or other open metal, used as the conductive support.

Figure 12A:
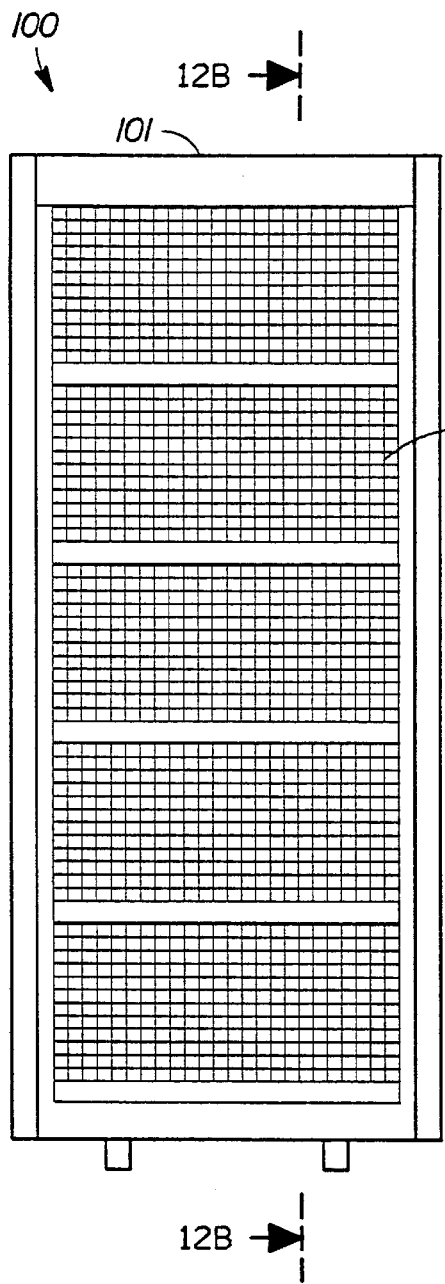
FIG. 12(a) is a face on view into the cathodes none face of a fin.
Figure 12B:
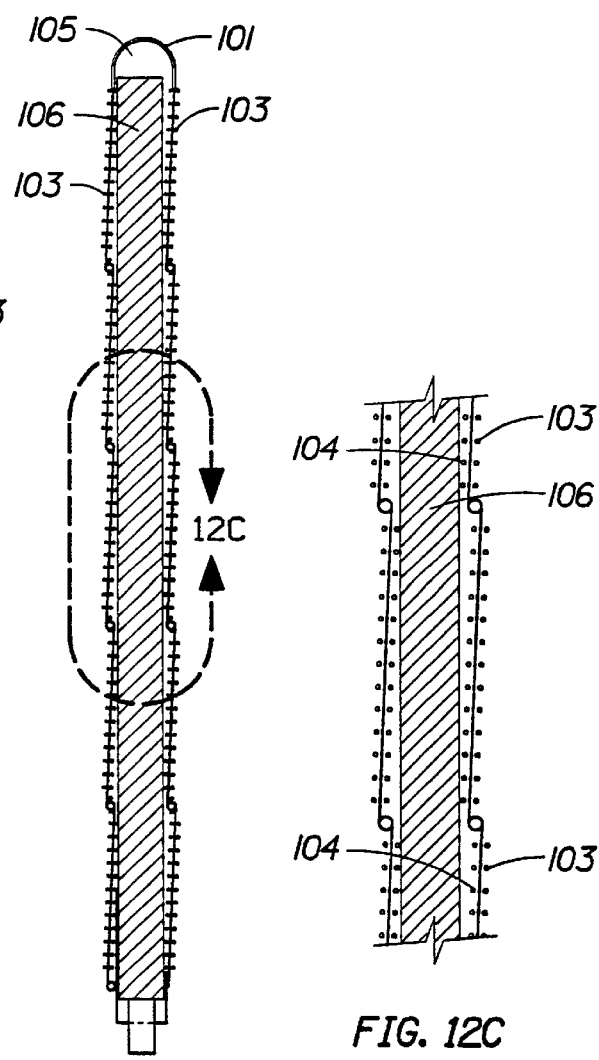
FIG. 12(b) is a cross-sectional view cut vertically near the center of FIG. 12(a), showing an embodiment of a dual electrode structure.
Figure 12C:
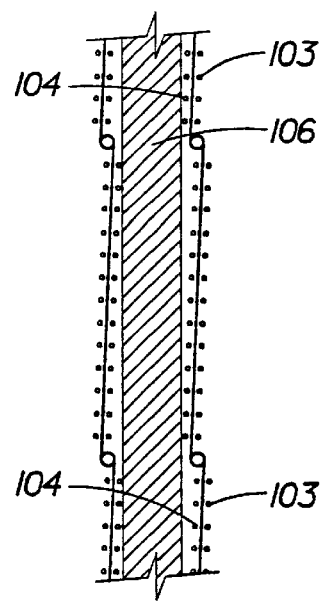
FIG. 12(c) is a view of an enlarged piece cut out of the side of 12(b) indicating the location of the wicking structure.

FIGS. 12(a–c) are three views of a fin configured for liquid fuel use. FIG. 12(a) is a top view of a liquid fuel cell system 100 showing the top view of a fin 101 defining a cathodic surface 103. FIG. 12(b) is a cross-sectional view of the fin 101 cut vertically near the center of the arrangement shown in FIG. 12(a). The anodes 104 in the fin 101 define anodic surfaces 105 that are provided with liquid fuel. FIG. 12(c) is an enlargement of a portion cut out of the fin 101 as presented in FIG. 12(b). The wick structure 106 is designed so that all of the anodes 104 are supplied with fuel at all times. Because of the high energy storage density associated with liquid fuels, the volume inside the fin allows the storage

TABLE I

Properties of Metal Conductive Components

| Label | Thickness (cm) | LWD[a] (cm) | SWD[a] (cm) | Areal density (g/cm$^2$) | Resistivity (LWD) (mΩ cm/cm) | Resistivity (SWD) (mΩ cm/cm) | Open Fraction (%) |
|---|---|---|---|---|---|---|---|
| Ni #1 | 0.028 | 0.167 | 0.125 | 0.01994 | 6.08 | 9.62 | 51 |
| Ni #2 | 0.028 | 0.172 | 0.125 | 0.01977 | 5.72 | 10.34 | 56.5 |
| Ni #3 | 0.0285 | 0.325 | 0.112 | 0.03046 | 2.79 | 10.0 | 43 |
| Ni #4 | 0.016 | 0.186 | 0.110 | 0.0493 | 1.78 | 4.68 | 35 |
| Ni D[b] | 0.041 | 0.185 | 0.113 | 0.0383 | 2.62 | 9.25 | 41 |
| Ti 77[b] | 0.009 | 0.138 | 0.075 | 0.0093 | 35 | 119 | 52 |
| SS 080[b] | 0.014 | 0.123 | 0.071 | 0.0288 | 33 | 82 | 31.4 |
| SS 4/0[b] | 0.009 | 0.1 | 0.079 | 0.0185 | 50 | 133 | 34 |
| SS 100[b] | 0.011 | 0.134 | 0.1 | 0.0219 | 42 | 123 | 40 |
| Cu 4/3 | 0.0172 | 0.14 | 0.0074 | 0.0545 | 0.38 | 1.17 | 31 |
| Cu 3/0 | 0.017 | 0.2 | 0.09 | 0.06958 | 0.26 | 0.93 | 37.8 |
| Ni Foam | 0.05 | n.a.[c] | n.a.[c] | 0.0853 | 3.2[d] | n.a.[c] | 68[e] |
| Perf. SS | 0.0135 | n.a.[c] | n.a.[c] | 0.06 | 6.7[d] | n.a.[c] | 38[f] |

Notes:
[a]LWD and SWD are defined in FIG. 11.
[b]Not gold plated.
[c]Not applicable, this material is not asymmetric.
[d]Resistivity in either direction, material is symmetric.
[e]Calculated.
[f]Manufacturer's value.

Perforated metal sheets are also suitable as the conductive component within the electrode. Compared to expanded metal, perforated metal sheets are generally stronger and more conductive, but generally display a smaller open fraction (<40%) and are thus less conducive to gas exchange.

Woven metal wire products are suitable as well. Compared to expanded metal, woven products have more open area (up to 80%) for superior gas exchange. However, the weaving process makes woven metal wire products more expensive to manufacture than expanded metal, and, because electrical conductivity requires that the current flow through a large number of wire-to-wire contacts, resistivity is high. Furthermore, because of the woven nature of the material, any individual sheet can only be as thin as twice the wire diameter.

Conventional carbon cloth supported gas diffusion electrodes have a gas diffusion matrix consisting of conductive carbon powder bound together, and to the carbon cloth, by polytetrafluoroethylene (PTFE). Since the expanded metal has substantially more open area than the carbon cloth, a modification of the gas diffusion matrix formulation would be advantageous. It has been found that replacing a portion of the carbon powder with finely cut and divided conductive carbon fibers produces a superior gas diffusion matrix. The of sufficient fuel to operate for an extended period of time, from several hours to a day, depending on the load. This eliminates the need for any other fuel storage in such a system, unless an even more extended operating period is required. Refueling the liquid fueled system is equally easy, requiring only a container of a pourable liquid.

Fuel cell designs in accordance with the present invention are useful in a wide variety of configurations.

FIGS. 31(a–c) are three views of a fin depicting a compact fuel cell arrangement. In this arrangement, two sets of cells, fabricated using a common conductive element in the electrodes as the polar element, are attached to opposing faces of a single polymeric frame. configured for liquid fuel use.

FIG. 31(a) is a top view of a hydrogen/air fuel cell system 310 showing the top view of a fin 311 defining a cathodic surface 313.

FIG. 31(b) is a cross-sectional view of the fin 311 cut vertically near the center of the arrangement shown in FIG. 31(a).

FIG. 31(c) is a cross-sectional view cut horizontally near the center of FIG. 31(a).

Figure 25:
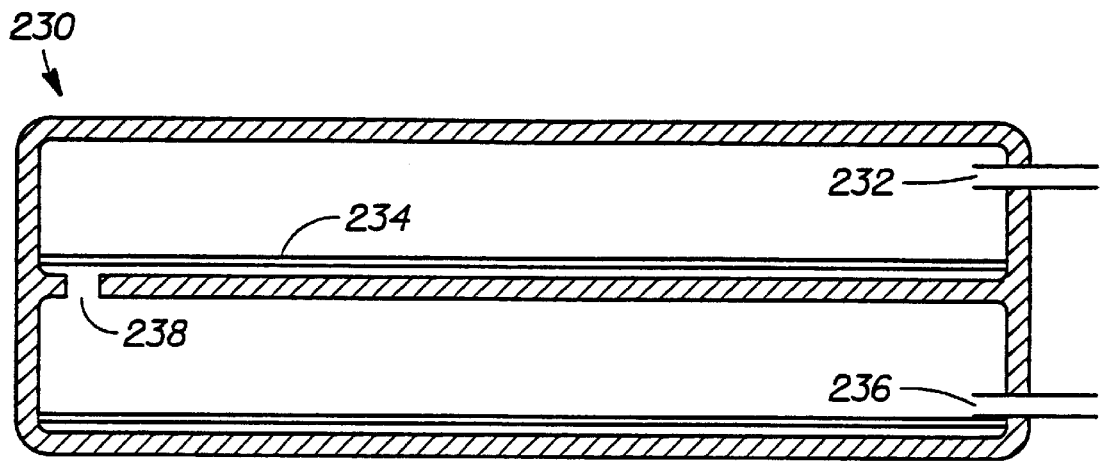
FIG. 25 is a schematic diagram depicting a polymeric frame.

FIG. 25 is a schematic diagram depicting a polymeric frame 230 that can be used in conjunction with the present invention. The polar frame comprises a first passage 232 for hydrogen feed, a central element 234, and a second passage 236 for hydrogen exit. The central element serves both in preventing contact between the electrodes and channeling the hydrogen in a U-shaped course through a crossover channel 238. It can be easily appreciated that non-polymeric frames can also be used with the present invention. However, when conducting frames are used, they must be insulated to prevent the formation of a short circuit when the frame contacts the face of the anodes.

In the arrangement schematically depicted in FIG. 31, a large fraction of the external surface of the fuel cell assembly serves as active cathode area. The fins of FIG. 31 can be used as the basic structural element in larger arrangements such as the ones depicted in FIGS. 8 and 9. These fins can also be operated individually in small power supplies. While the fin of FIG. 31 comprises two sets of 5 cells each for a total number of 10 cells connected in series, there are no limitations on the number of cells that can be connected in the manner described here. Arrangements with a larger or a smaller number of cells are considered within the scope of the present invention. Also, It is not a necessary element of this invention to make symmetrical fins with the same number of cells on two sides, non-symmetrical arrangements are variations within the scope of the present invention. The arrangement described in this invention presents high flexibility. Adjustments in the number of cells and their arrangement are provided for by the present invention so that optimum use is obtained in any particular application.

The significant advantages provided by the compactness in the arrangement presented in this invention may be offset by the difficulty in dissipating the heat generated by operating such compact systems. Another aspect of the invention is to provide means for avoiding the loss in efficiency that may occur when the fuel cell system is operated for longer periods of time.

Figure 26A:
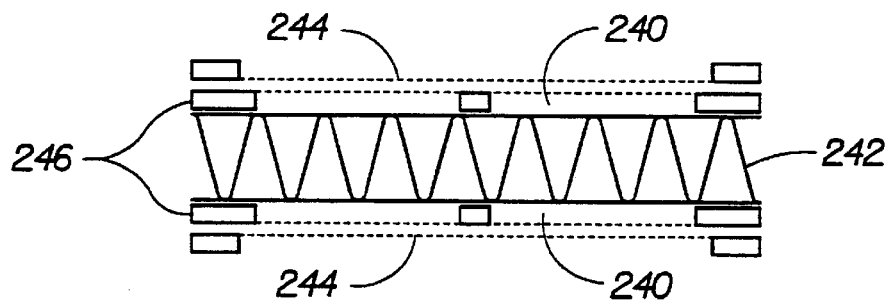
FIG. 26(a) is a cross sectional view of a segment of a fin similar to the fin of FIG. 31(b) with an internal heat transfer structure added.
Figure 26B:
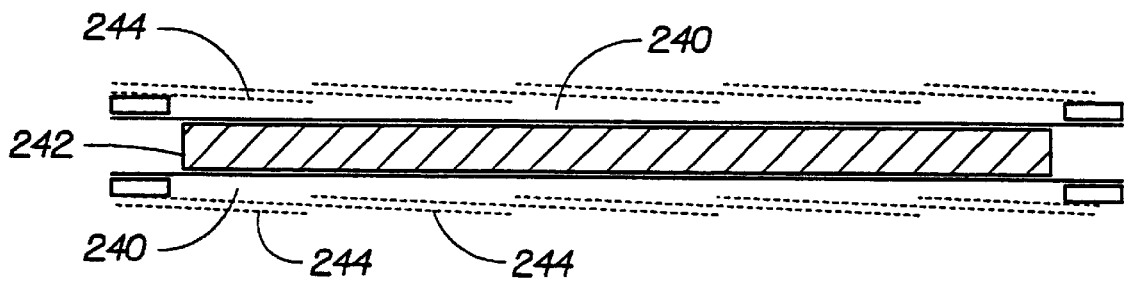
FIG. 26(b) is an edge view of the fin of FIG. 26(a) showing the internal heat structure.

FIG. 26(*a*) is a cross sectional view of a segment of the fin of FIG. 31(*b*) comprising two membrane and electrode assemblies 244 positioned opposite each other with an internal heat transfer structure 242 positioned between the hydrogen feeds 240. The polymer frames 246 are also shown. FIG. 26(*b*) is an edge view of the fin of FIG. 12(*b*) showing the internal heat structure 242.

Figure 27:
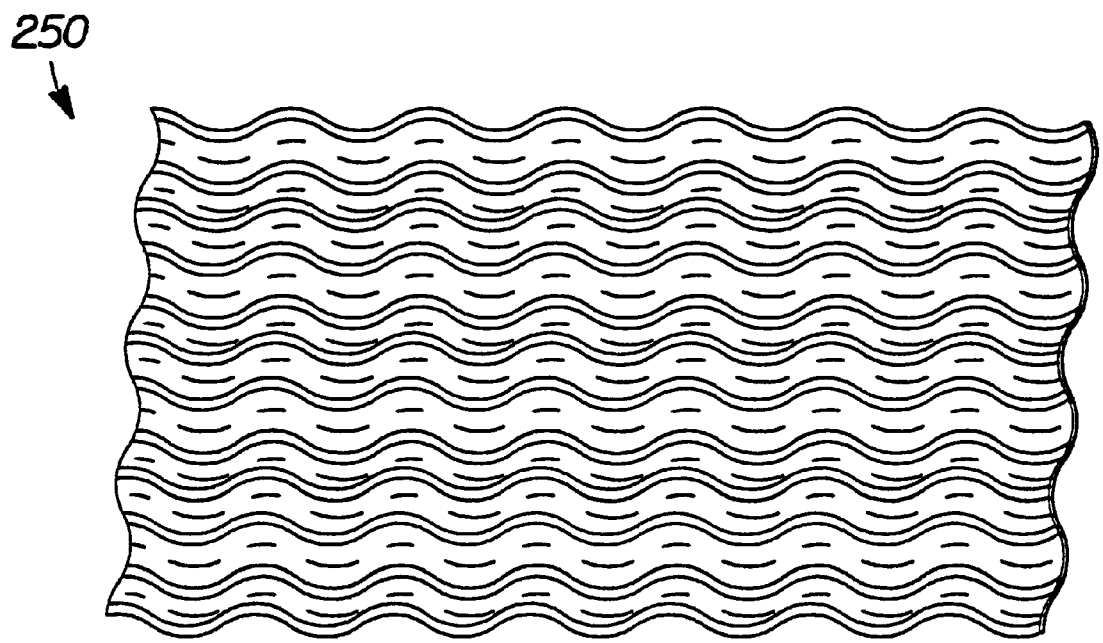
FIG. 27 is a drawing depicting a wavy convoluted aluminum sheet as an example of internal heat transfer structures.

FIG. 27 is a drawing depicting a wavy convoluted aluminum sheet 250 as one example of internal heat transfer structures that can be used in conjunction with the present invention. The sheet provides one example for the inclusion of a cooling channel and a heat transfer element in the fin of FIG. 12. In this instance, the sheet is preferably oriented so that the flow direction of the channels in the sheet are parallel to the longest dimension of the fin. Those skilled in the art of heat transfer can easily appreciate that other orientations of the sheet or the use of an element made of a different metal or presenting a different pattern provide internal heat transfer structures that can be used with the cooling system described here. The presence of an internal heat transfer structure is not a necessary element of the cooling system disclosed in this invention. Effective cooling may be obtained even if the fin is fabricated with a channel that has no heat transfer element.

While the examples discussed below describe cooling systems that present a cooling flow parallel to the long direction of the fin, equal cooling efficiency is obtained when the cooling flow is parallel to the short direction of the fin. One practical advantage presented by arrangements having parallel flow of cooling air and reaction air is the possibility to use one fan for producing air flow that can be used for both purposes. The advantage in using a single fan can be offset when independent control of the cooling and reaction flows is desirable. On the other hand, fuel systems with cooling and reaction flows that are perpendicular present the advantage of independently controlling the flows but require at least two air moving devices. The choice between an arrangement with parallel cooling and reaction flows and an arrangement with perpendicular flows depends on the particular application.

Figure 28:
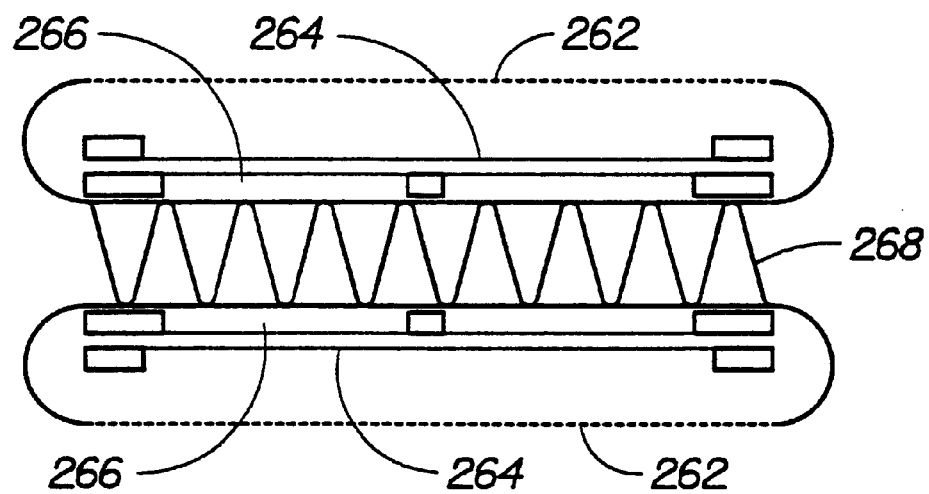
FIG. 28 is a cross sectional view of the fin of FIG. 26(a) with the back plane of the monopolar cells extended and folded over to form a protective cover.

Another aspect of the invention is to provide for protection of the exposed cathodes from damage by foreign objects. Such protection can be achieved by adding a protective screen to the arrangement described in FIG. 26. FIG. 28 is a cross sectional view of the fin of FIG. 26(*a*) with the back plane of the monopolar cells extended and folded over to form a protective cover. The fin comprises M&E's 264, hydrogen manifolds 266, a cooling channel with a heat transfer element 268, and ventilated protective covers 262. In one embodiment of the invention, the protective cover is formed by extending the metal sheet serving as the backside of the hydrogen manifold, perforating it, and bending it around to form a cover over the faces of the cathodes. By using only a single sheet of metal as both the backside of the manifold and as the protective structure, thermal conductivity is maximized. An additional advantage of the present design is the contribution of the protective structure to heat dissipation during the operation of the fuel cell system. The portion of the fin serving as a protective cover comprises an open area so that efficient air exchange with the atmosphere is maintained. The open area may be obtained by placing perforations in the portion of the fin that serves as a protective cover. Other means for maintaining gas exchange between the cathodes and the atmosphere are within the scope of the present invention.

Figure 29:
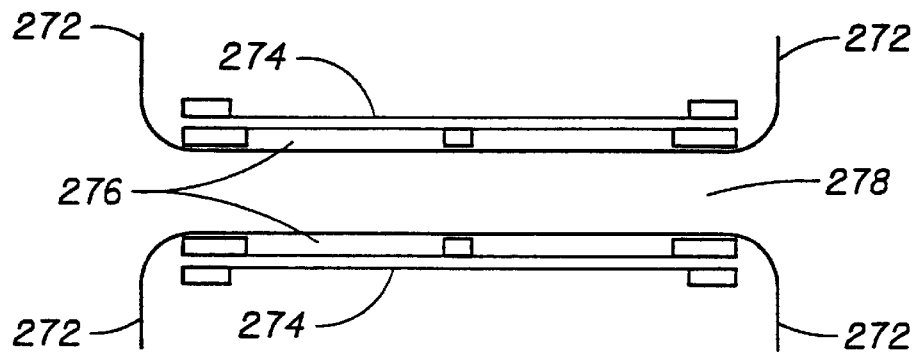
FIG. 29 is a cross sectional view of a fin with protective cooling fins.

FIG. 29 is a cross sectional view of a fin with protective cooling fins. The cathodes 274 are protected by protecting cooling fins 272 that are bent and form bumpers at the edge of cooling channel 278. In this arrangement, the bumpers offer protection to the cathodes while serving as the heat transfer element. The arrangement also presents the advantage of providing a fuel cell system with cathodes that have maximum access to the atmosphere.

Other arrangements included within the scope of the present invention are shown in FIGS. 13(*a–b*). FIGS. 13(*a*) and 13(*b*) are side views of two configurations in which the cells are wrapped around the fuel tank 118. FIG. 14 is a cross-sectional view of a monopolar fuel cell system 120. Curved monopolar fuel cell frames 122 and cured membrane and electrode assemblies 124 are mounted on the outside of a vessel 128 that serves as a fuel reservoir for storing the fuel to be consumed by operating the fuel cell system. When the fuel cylinder is a storage vessel filled with liquid fuel, the operating time for this configuration would be much longer than when hydrogen gas is used as the fuel. It is important to note that in this invention, the conceptual difference in the design of gas and liquid fueled cells is the addition in liquid fuel cell designs of a wicking element inside the open volume reserved for hydrogen delivery in the gas fuel cell design.

Given the high energy density of liquid fuels, a monopolar fuel cell of the design taught here can be fabricated in a wide variety of shapes that can be integrated into the device that they are intended to power. All of the needed fuel can be stored within the fuel cell structure (i.e., no external tank). For example, a methanol-fueled, 5 Watt flat panel fuel cell with a 12 cell array, operating at a potential of 0.5 V/cell and a current density of 60 mA/cm$^2$ occupies an area of about 100 cm² and is 7.5 mm thick. The fuel stored inside such a cell is adequate for over 20 hours of operation.

The examples shown here are all illustrative of fuel cells, but the present invention can be useful in other applications as well. For example, by filling the wick shown in FIG. 12 with water, the stack can be operated as an electrolyzer to generate hydrogen at the cathode and oxygen at the anode. It can be readily appreciated that various other applications of the concepts described here are within the scope of the present invention.

The following examples show the function of this invention and some of its preferred embodiments.

EXAMPLE 1

This example illustrates a gas diffusion electrode using carbon powder as the conductive material in the metal supported matrix.

A gas diffusion electrode was made by mixing Vulcan XC-72R high surface area carbon powder (available from CABOT Technology Division, Pampa, Tex.) with polytetrafluoroethylene "PTFE" suspension (such as T-30, available from DuPont, Wilmington Del.) in a 60:40 ratio (based on the dry weight of the PTFE), water, and a nonionic surfactant (such as Tritonx100, available from Fisher Scientific, Fair Lawn, N.J.). The carbon/PTFE mixture was sonicated to reach complete dispersion and the resulting paste was spread onto an expanded foil grid. This grid, fabricated from expanded copper foil, had previously been electroplated with a protective gold layer, through the use of a standard commercial gold electroplating both (E-56, from Engelhard, Corp., Iselin, N.J.) and serves as the grid to form a gas diffusion electrode.

The bulk of the water was removed from the gas diffusion electrode by filtration. Polycarbonate filter membranes (5 μm pore size, available from Poretics, Livermore, Calif.) were found to give the most efficient water removal, with only traces of carbon occasionally passing through and easy separation of the electrode from the filter. Finer pore materials (1 and 3 μm) blocked all of the carbon, but had much lower rates for water removal. Other filter materials did not release well from the electrode and retained carbon on the surface of the filter. The use of a heat lamp to gently warm the electrode during the filtration step was found to improve the water removal. The electrode was dried at room temperature in a vacuum oven for 4 to 5 hours, then further dried at 60° C. in the same vacuum oven overnight. Finally, the electrode was treated in an argon atmosphere at 320° C. for 2 hours in order to sinter the PTFE and decompose the surfactant. The density and thickness of the final gas diffusion electrodes were about 0.57 g/cm³ and 0.7 mm, respectively.

EXAMPLE 2

This example illustrates a gas diffusion electrode using carbon fiber with carbon powder in the metal supported matrix.

The gas diffusion electrode was made by mixing Vulcan XC-72R high surface area carbon powder (CABOT) and Thornel™ DKD-X carbon fiber (Amoco Corp., Apharetta, Ga.) with PTFE suspension (T-30, DuPont), in a 52:17:31 ratio (based on the dry weight of the PTFE), water, and nonionic surfactant (Tritonx100). The carbon/PTFE mixture was sonicated and fabricated into a metal supported gas diffusion electrode as described in example 1.

EXAMPLE 3

This example illustrates a gas diffusion electrode using carbon fiber with carbon powder in the metal supported matrix.

The gas diffusion electrode was made by mixing Vulcan XC-72R high surface area carbon powder (CABOT) and carbon fiber obtained by ball milling Toray TGP-H paper (Toray Corp., New York, N.Y.) with PTFE suspension (T-30, DuPont), in a 42:17:41 ratio (based on the dry weight of the PTFE), water, and nonionic surfactant (Tritonx100). The carbon/PTFE mixture was sonicated and fabricated into a metal supported gas diffusion electrode as described in example 1.

EXAMPLE 4

This example illustrates a gas diffusion electrode using carbon fiber with carbon powder in the metal supported matrix.

The gas diffusion electrode was made by mixing Vulcan XC-72R high surface area carbon powder (CABOT) and Thornel™ DKD-X carbon fiber (Amoco Corp.) with PTFE suspension (T-30, DuPont), in a 33:16:51 ratio (based on the dry weight of the PTFE), water, and nonionic surfactant (Tritonx100). The carbon/PTFE mixture was sonicated and fabricated into a metal supported gas diffusion electrode as described in example 1.

EXAMPLE 5

This example illustrates a gas diffusion electrode using carbon fiber with carbon powder in the metal supported matrix.

The gas diffusion electrode was made by mixing Vulcan XC-72R high surface area carbon powder (CABOT) and Thornel™ DKD-X carbon fiber (Amoco Corp.) with PTFE suspension (T-30, DuPont), in a 40:20:40 ratio (based on the dry weight of the PTFE), water, and nonionic surfactant (Tritonx100). The carbon/PTFE mixture was sonicated and fabricated into a metal supported gas diffusion electrode as described in example 1.

The compositions from the first five examples are summarized in Table II.

TABLE II

The Compositions Of The Gas Diffusion Electrode in Examples 1 through 5

| Example | XC-72R carbon powder | Thornel carbon fibers | Ground Toray paper | PTFE | Triton X100 |
|---|---|---|---|---|---|
| 1 | 60% | | | 40% | 2% of C |
| 2 | 52% | 17% | | 31% | 2% of C |
| 3 | 42% | | 17% | 41% | 2% of C |
| 4 | 33% | 16% | | 51% | 2% of C |
| 5 | 40% | 20% | | 40% | 2% of C |

EXAMPLE 6

This example demonstrates an alternative method for forming the gas diffusion matrix.

The gas diffusion matrix can also be fabricated by a direct filtration approach where the metallic conductor is placed on a polycarbonate filter and the gas diffusion matrix impregnated into the conductor by filtration from a more dilute suspension. Vulcan XC-72R high surface area carbon powder, conductive carbon fiber (Thornel™ DKD-X), and PTFE suspension, (T-30), were mixed in a 33:16:51 ratio (based on the dry weight of the PTFE) with water and nonionic surfactant. The mixture is sonicated to separate and disperse all of the particles into a uniform suspension. This mixture is then filtered through a cleaned expanded nickel conductive element placed on a polycarbonate filter membrane (1 μm pore size) to remove water and directly form a gas diffusion layer around the metallic conductor.

EXAMPLE 7

This example demonstrates a method for forming the active portion of the electrode.

The thin film catalyst layer for the electrode was made by mixing platinum black catalyst (such as fuel cell platinum black catalyst available from Engelhard, Iselin, N.J.) with a 5% solution of 950 equivalent weight Nafion® (available from Solution Technology, Inc., Mendenhall Pa.). Sufficient water was added to produce a viscous, but fluid mixture. The mixture was then sonicated to disperse the platinum black and give a uniform ink. This ink was brushed directly onto the Nafion® membrane and dried.

EXAMPLE 8

This example demonstrates an alternative method for forming the active portion of the electrode.

The thin film catalyst layer for the electrode was made by mixing platinum black catalyst (Engelhard's fuel cell grade) with a 5% solution of 950 equivalent weight Nafion® (available from Solution Technology, Inc., Mendenhall Pa.). Sufficient water was added to produce a viscous, but fluid mixture. The mixture was then sonicated to disperse the Platinum black and give a uniform ink. This ink was brushed directly onto a gas diffusion matrix which had been produced as described in Example 7 and dried at under ambient conditions.

EXAMPLE 9

This example demonstrates still another method for forming the active portion of the electrode.

The catalyst layer for the electrode was made by mixing platinum black catalyst (Engelhard's fuel cell grade) with a PTFE suspension (T-30). Sufficient water was added to produce a viscous, but fluid mixture. The mixture was then sonicated to disperse the platinum black and give a uniform ink. This ink was brushed directly onto a gas diffusion matrix which had been produced as described in Example 7. The electrode was allowed to dry under ambient conditions until it appeared dry to the eye, then further dried at 60° C. in a vacuum. After vacuum drying the electrode was heated to 320° C. in a flowing argon atmosphere and held at that temperature for 10 minutes to sinter the PTFE and decompose the surfactant.

EXAMPLE 10

This example demonstrates still another method for forming the active portion of the electrode.

The thin film catalyst layer for the electrode was made by mixing platinum black catalyst (Engelhard's fuel cell grade) with a 5% solution of 950 e. w. Nafion® (Solution Technology, Inc.). Sufficient water was added to produce a viscous, but fluid mixture. The mixture was then sonicated to disperse the Pt and give a uniform ink. This ink was brushed directly onto a Nafion® membrane, and onto a gas diffusion layer. The two electrocatalyst layers were allowed to dry separately under ambient conditions.

EXAMPLE 11

This example demonstrates the assembly of a membrane and electrode assembly (M&E) from the parts described above.

Final assembly of the M&E was accomplished by hot pressing the components to bond them together. Two gas diffusion electrodes together with a membrane were placed in a press which had been preheated to 165° C. and compressed at a pressure of 380 lbs/cm$^2$. Where Nafion® bonded electrodes had been used, the M&E was held at that temperature and pressure for approximately five minutes to "cure" the Nafion® solution to insolubility.

EXAMPLE 12

This example demonstrates the operation of a single cell fuel cell produced as described above.

The techniques described in examples 2, 10, and 11 were used to produce M&E's for a series of single cells. These cells were operated and the results obtained are shown by the polarization curves in FIG. 15. All of these M&E's were fabricated using Nafion® 105 membrane, with 2 mg Pt/cm$^2$ thin film electrodes, and three rather disparate metallic conductors (56.5% open area expanded nickel, 31% open area expanded copper, and foamed nickel). All three polarization curves were measured with the cell operating under the same conditions, 20 to 25° C. ambient temperature, with some self-heating of the cell, air supplied by free convection, and essentially no pressure is applied to the hydrogen. As is readily apparent, all three gave essentially the same performance at current densities below 300 mA/cm$^2$, with all potential differences less than 20 mV. (The region of interest for fuel cells of this type covers the current densities from 0 to 300 mA/cm$^2$. Even at the upper end of this region, the stack will generate heat faster than it can be removed by passive means. The ensuing temperature rise will dry out the membrane, reducing performance.) Electrodes were also produced using perforated stainless steel as the metallic conductor and yielded results significantly inferior to those shown here.

EXAMPLE 13

This example demonstrates the effect of membrane selection on single cell performance.

Figure 16:
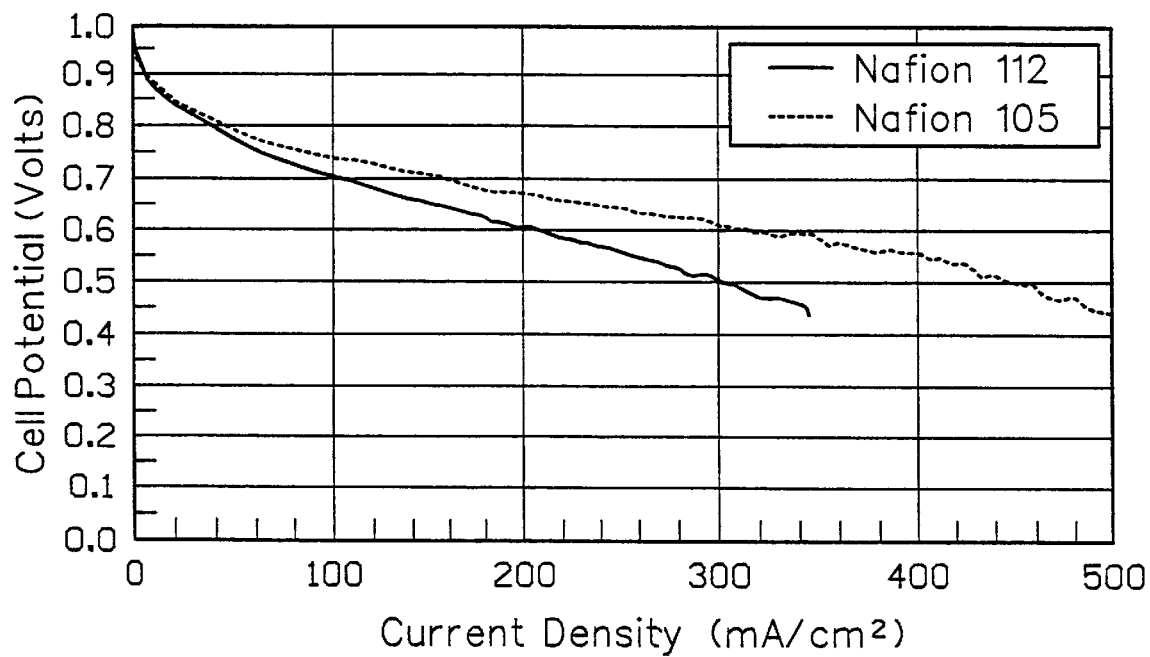
FIG. 16 is a graph showing polarization curves for M&E's produced using two different membrane materials with the same conductive element (Cu 4/3) and the same compositions for both the gas diffusion layer and the catalyst layer.
Figure 17:
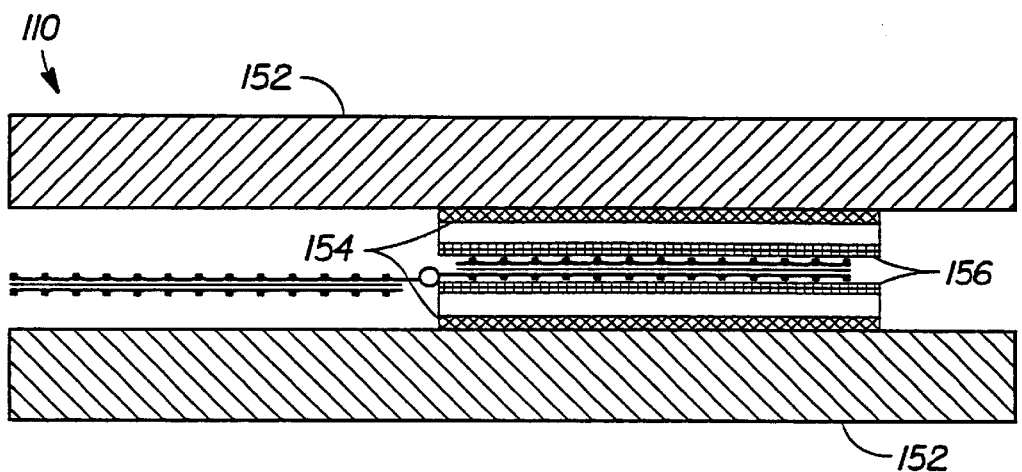
FIG. 17 is an illustration of the arrangement used to focus the press load on one cell of a multi-cell module.

The properties of the PEM membrane used to fabricate the M&E's is significant to their performance. FIG. 16 shows the polarization curves for two M&E's operated under the same conditions, (20 to 25° C. ambient temperature, with some self-heating of the cell, air supplied by free convection, and essentially no pressure on the hydrogen), with the only difference being the membrane material used to fabricate the M&E. The cell utilizing the thinner membrane, Nafion® 112, (0.002", 0.051 mm), clearly out performs the one utilizing the thicker membrane, Nafion® 105, (0.005", 0.127 mm). From the difference in the slopes in the linear region of the polarization curves it appears that the two have different internal resistances, but the two membranes, measured under the same conditions, have very similar resistances, with the higher specific conductivity of the Nafion® 105 offsetting its increased thickness.

The key to the difference performance is the difference in the thickness of the two membranes and how it affects water diffusion. In a typical bipolar fuel cell, both fuel and oxidizer are preferably humidified to a dew point near the operating temperature of the stack. This is done to insure that the membranes are kept fully saturated with water to maximize their conductivity. In the monopolar fuel cell, little, if any, water is supplied by the fuel, and electroosmotic drag is constantly moving the water within the membrane from the anode to the cathode, as it travels with the protons. The dew point of the air is typically 10° C. or more below the ambient temperature, which promotes evaporation from a saturated surface. If the cell has heated itself even 5° C. above ambient, it adds to the difference. Under these conditions, water is readily lost by the cathode of the fuel cell, and the membrane can dry out.

One source of water available to the membrane is the water formed at the cathode. This water can either evaporate away, or be absorbed into the membrane. It is clear that the surface of the membrane in contact with the cathode will be saturated with water, but the rest of the membrane will only have access to this water if it diffuses away from the cathode, toward the anode. The rate of diffusion increases with a reduced length of the diffusion path (i.e. thickness) and a steep concentration gradient. As a result, the thinner membrane is better humidified, and has a lower resistance during operation, for improved performance.

EXAMPLE 14

Figure 15:
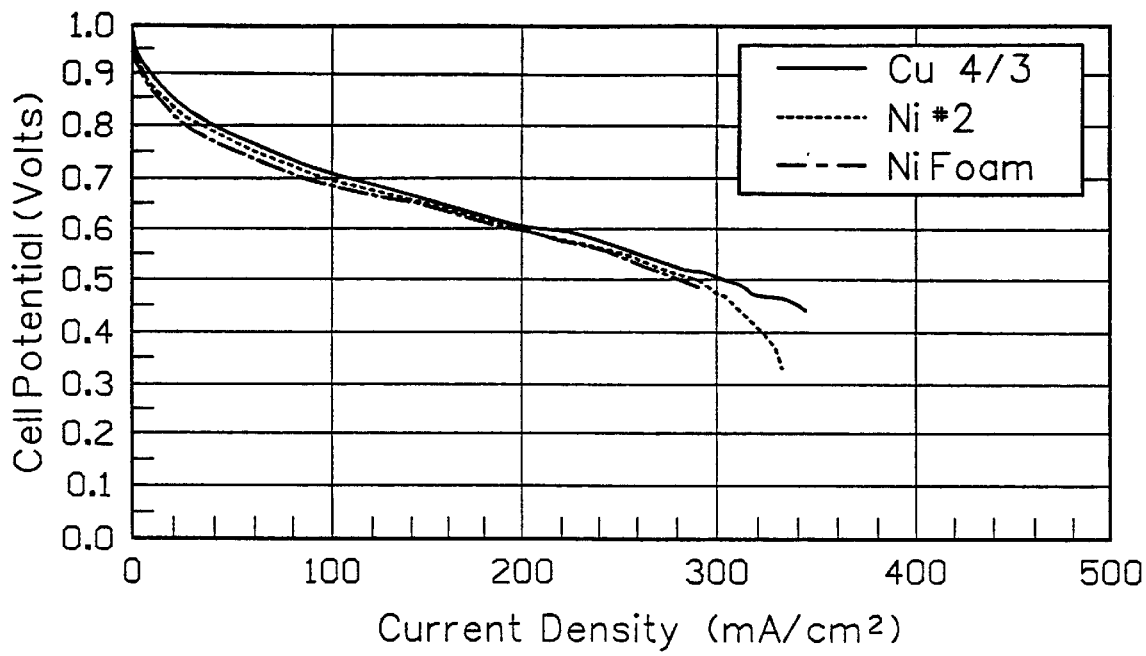
FIG. 15 is a graph showing polarization curves for M&E's produced using three different conductive elements in the electrodes with the same composition for the gas diffusion layer and the catalyst layer.

This example demonstrates the assembly of multi-cell modules. Assembling the multi-celled modules requires multiple press cycles, and also requires a modification of the press geometry, with the addition of a pair of blocks to act as a smaller platen than is normally available in a heated press. This permits the cell being bonded to be placed near the center of the press for maximum uniformity of both load and heat, while insuring that only one cell is pressed at a time. This arrangement is illustrated in FIG. 15. Although the pins cannot be seen in this cross-section, which is intended to highlight the M&E, the two small blocks are kept in alignment by a set of four pins. These pins are firmly set in the lower block, with the upper block sliding on the pins. The use of these pins keeps the two surfaces precisely aligned through the pressing process.

Figure 18:
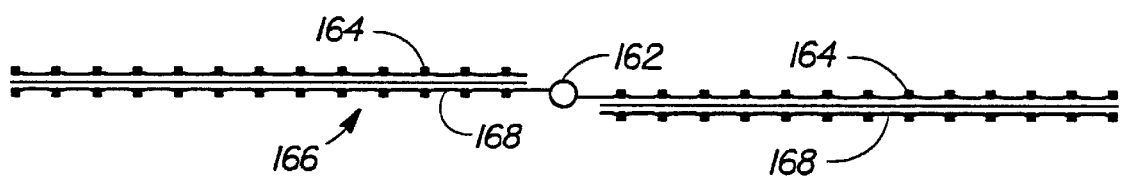
FIG. 18 is a cross-sectional view of an electrode fabricated using gas diffusion electrodes with a metal grid as part of the electrode for improved internal conductivity, as may be used in a dual electrode structure.

The multi-cell modules produced are like the one illustrated in the cross-section shown in FIG. 18. The key feature of these modules is the use of a common metal grid for the anode of one cell and the cathode of the next cell in the series. This eliminates the need for any additional current collectors or frames. This effectively reduces the number of parts needed to assemble a monopolar fuel cell module, as well as the number of electrical junctions. Each electrical junction eliminated reduces the number of potential failure points and the potential for contact resistances.

In FIG. 18 the gas barrier is shown as being substantially thicker than the metal grid. While some assemblies have been produced in this manner, it is by no means a requirement of this invention. A barrier that is the same thickness as the grid is equally effective.

EXAMPLE 15

This example demonstrates the performance of a two-cell module.

Figure 19:
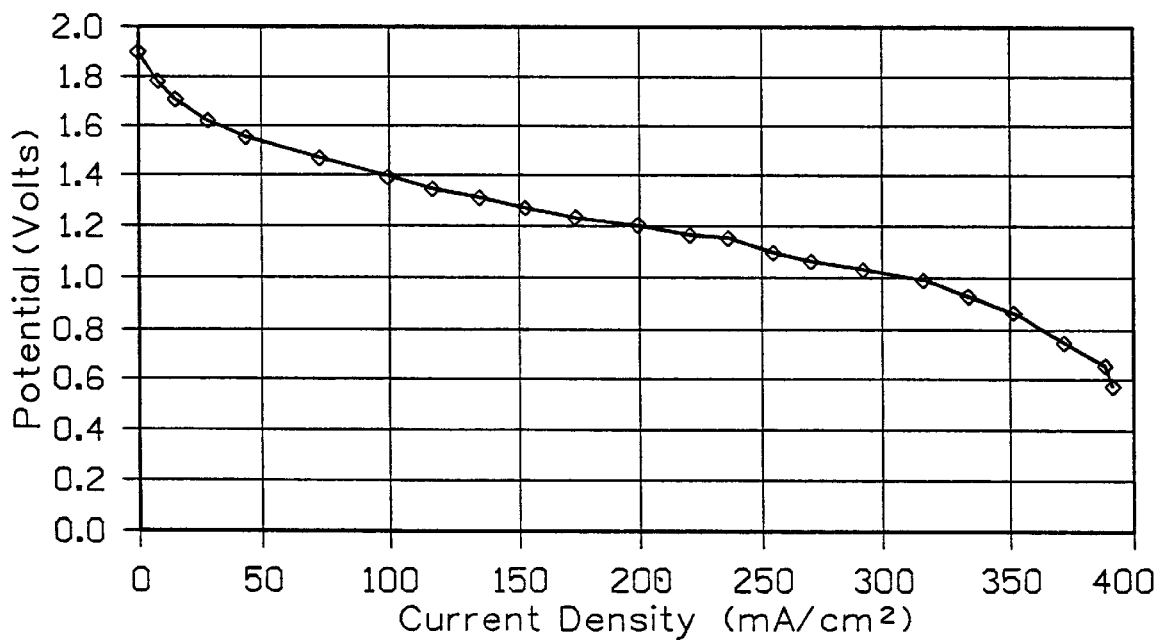
FIG. 19 is graph showing the polarization curve for a two-cell monopolar module with the cells connected through their common electrode support.

FIG. 19 shows a polarization curve for a two-cell module produced using M&E's produced as described in example 14, above, using Nafion® 112 membranes. The cells in this nodule had an active area of about 16 cm². This module produced a power output of 85 mW/cm² (for each cell) at a current density of 125 mA/cm² (0.678 Volts), the intended operating point. Although the polarization curve extends to a current density of nearly 400 mA/cm², a current density of approximately 200 mA/cm² represents the highest power that could be sustained. At higher current densities the cells gradually heated up until the membranes began to dry-out, and the performance declined.

EXAMPLE 16

This example demonstrates the performance of a three-cell module.

Figure 20:
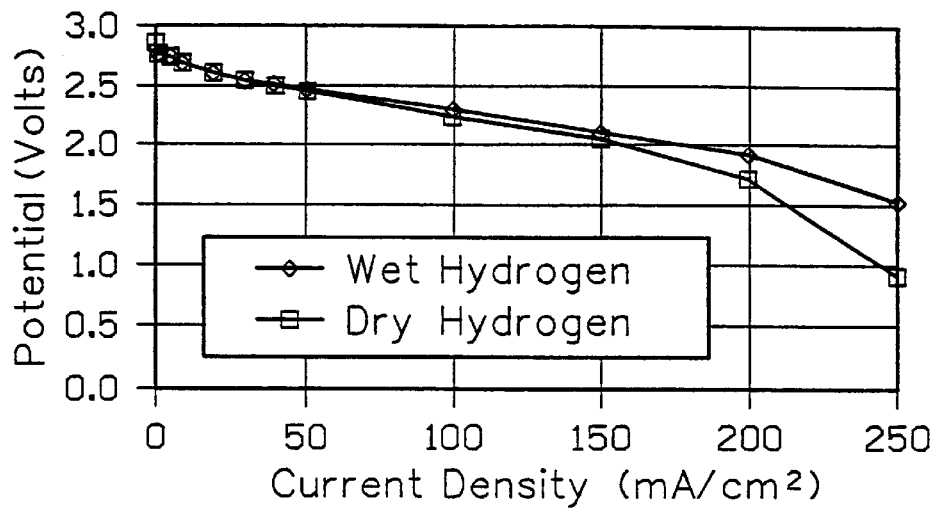
FIG. 20 is a graph showing polarization curves for a three-cell monopolar fuel cell module illustrating the effect of fuel humidification on the unit's performance.
Figure 21:
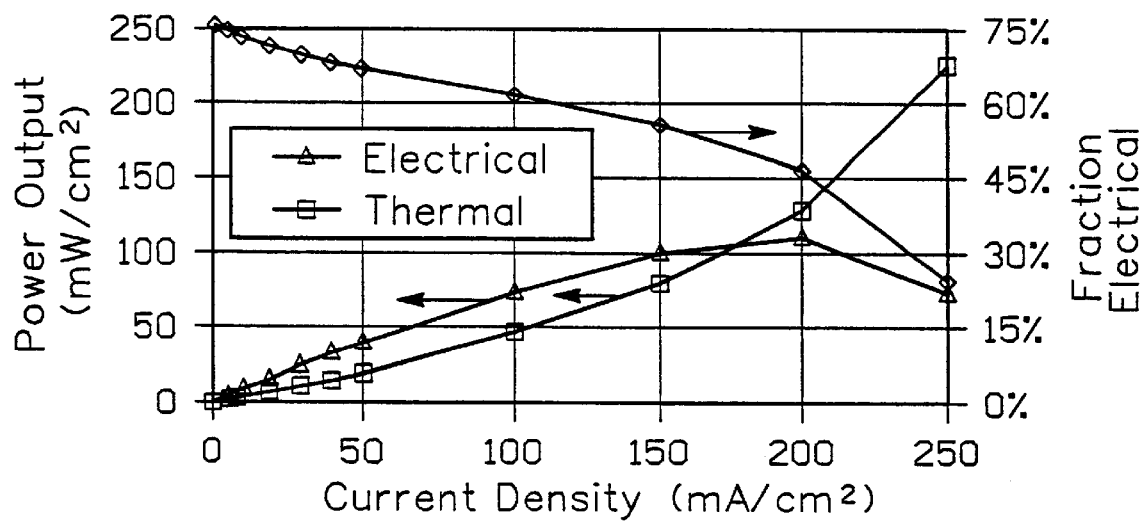
FIG. 21 is a graph showing the power output of the three-cell monopolar fuel cell module shown operating without humidification in FIG. 20.

A three-cell module was assembled as taught in example 14 and operated to determine the effect of fuel humidification on performance. FIG. 20 shows the effect of fuel humidification on the performance of this three cell module. There is no significant difference at current densities below 150 mA/cm². Above 150 mA/cm² the use of humidified hydrogen produced an improvement in the module's performance. This improvement can be attributed to an improvement in the modules ability to offset the greater heating rates produced at the higher current densities, with the additional water entering with the fuel compensating for increased evaporative losses in two ways: supplying water to keep the membrane humidified, and adding extra water to remove heat by evaporation. The output of the module operating without humidification is shown in FIG. 21, with the electrical and thermal contributions separated. It is clear from this figure that there is substantial heat production at higher current densities, more than can be removed by simple evaporative cooling. This is one of the reasons for designing the system to normally operate at current densities of 125 mA/cm², or less.

EXAMPLE 17

This example demonstrates the effect of fuel pressurization on the performance of a three-cell module.

Figure 22:
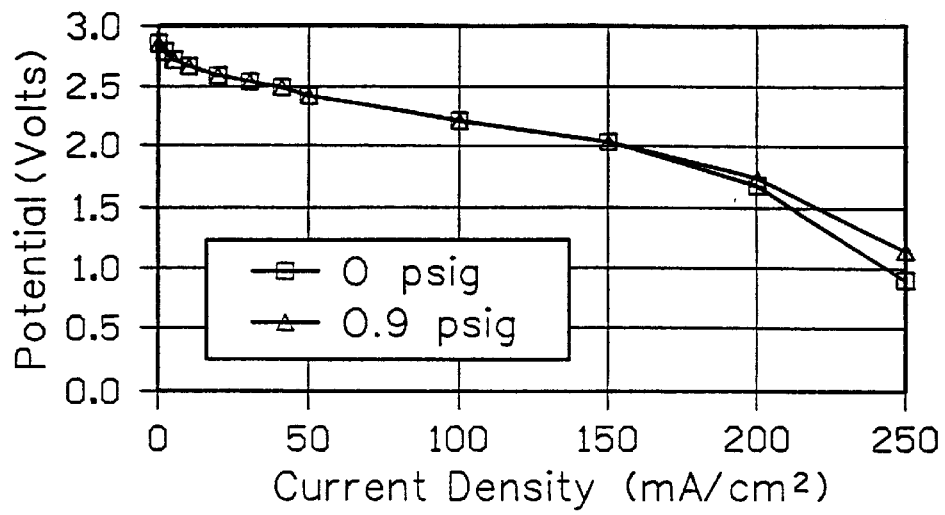
FIG. 22 is a graph showing polarization curves for a three-cell monopolar fuel cell module illustrating the effect of hydrogen pressure on the unit's performance.

All of the data in examples 15 and 16 were measured with the fuel at ambient pressure. FIG. 22 shows the effect of pressurizing the fuel in the three cell system. The 0.9 psi back pressure was produced through the use of a 24 inch water column, with a slow purge maintained while operating this module and the gas exiting against the water pressure. The only region of the polarization curve where pressurization made any difference was at current densities of 200 mA/cm² and above, where a small improvement was observed. (At lower current densities, the voltages matched within ±2 mV.)

EXAMPLE 18

This example demonstrates the effect of air motion on the performance of a three-cell module.

Figure 23:
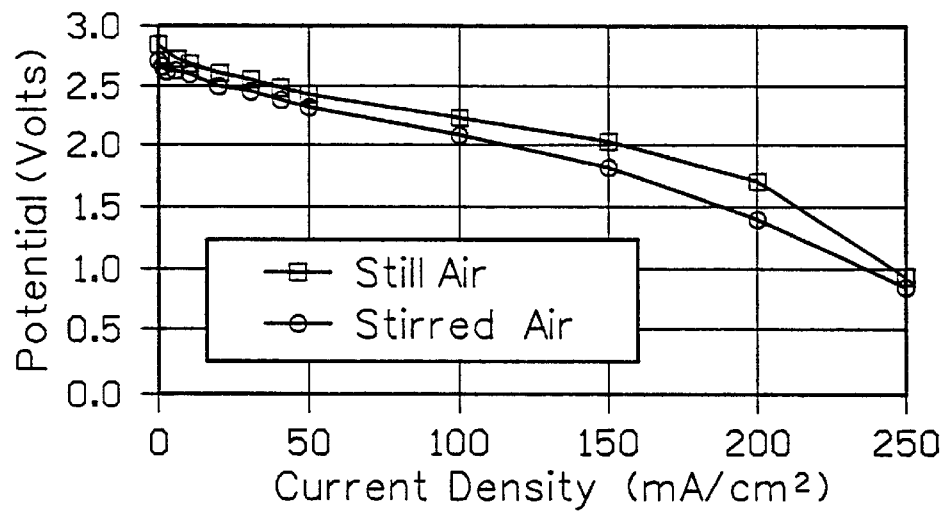
FIG. 23 is a graph showing polarization curves for a three-cell monopolar fuel cell module illustrating the effect of air motion on the unit's performance.
Figure 24:
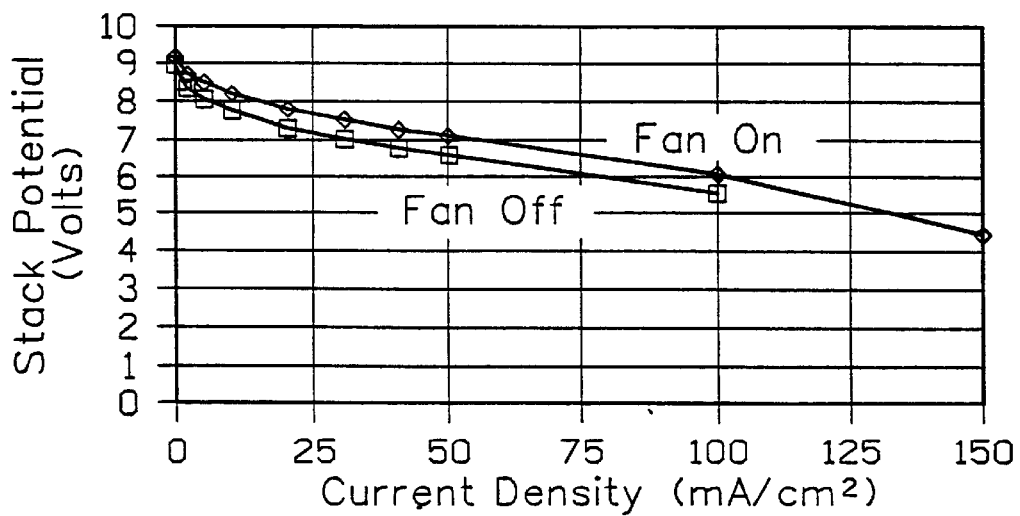
FIG. 24 is a graph showing the polarization curves for a stack operated with and without air flow from a fan.

All of the data shown in FIG. 20 and in FIG. 22 were obtained with air supplied solely by free convection. In order to evaluate the effect of adding forced motion and turbulence, a small fan was mounted several feet from the side of the module, and this fan used to maintain a stream of air flowing across the face of the module. Since the module is actually recessed into the face of the test fixture the stream did not strike the cathodes directly, but instead, created a large amount of turbulence over the cathode. FIG. 23 shows the effect that this turbulence has on the module's performance.

It is clear that the moving air stream is reducing the output by a significant amount. There are two possible reasons for this reduction in output. The first of these is increased cooling of the module, which results in poorer kinetics, and consequently a lower potential. The second is increased drying of the membranes in the module, with the drying leading to a rise in membrane resistance, and a decline in output. Since the drying will also lead to cooling the module, resolving these effects is difficult, but it is at least as easy to give this type of cell design too much air as it is to give it too little air.

EXAMPLE 19

This example illustrates the effect of using a cooling channel inside the structure of a fin-type monopolar cell structure.

Two sets of five M&Es were produced according to the procedure described in Example 14. Two frames similar to those shown in FIG. 25 were attached to sheets of 3 mil (0.003", 0.76 mm) aluminum using hot melt adhesive (Bemis 3218, Bemis & Associates, Shirley, Mass.) To bond the frame to a sheet of aluminum, a sheet of adhesive was first trimmed to match the shape of the polymeric frame. The sheet of adhesive was placed between the frame and the metal sheet, and the whole stack placed in a heated press and bonded by pressing for five minutes at 130° C. The metal polymer assemblies were attached to opposite sides of a sheet of convoluted aluminum, similar to the sheet depicted in FIG. 27. Thermally conductive epoxy (Omegabond® 101, Omega Engineering, Stamford, Conn.) was used in finishing the cooling channel. The fuel cells were the attached to the polymer frames, and connected to a hydrogen supply.

A small fan was connected to the channel, and the stack was operated first with the fan in an off position and then with the fan an on position. FIG. 29 is a graph showing the polarization curves for a stack operated with and without air flow from a fan. The polarization curves were obtained while operating the stack in the same conditions apart from the air flow from the fan. The stack was held at a current density of 80 mA/cm$^2$ for at least 20 minutes prior to the start of data collection. The results shown in FIG. 22 clearly indicate that providing an air flow through the cooling channel keeps the stack at a lower temperature resulting in an improvement of the performance. A gain of 520 mV was obtained at a current density of 100 mA/cm$^2$. When the fan is not operated, operation of the cells resulted in a heating of the stack 15 to 20° C. above the ambient temperature of the laboratory (25° C.), as determined by measuring the temperature at the surface of one of the cathodes. When the fan is operated, the temperature of the system was kept between 5 and 10° C. above ambient temperature. The difference in the increase in the temperature resulted in a significantly reduced rate of water loss from the cells, and improved stack potential. It is to be noted here that the fan was connected so that the air only flowed through the cooling channel and the cathodes being exposed to the same air flow in both tests.

While the foregoing is directed to the preferred embodiment of the present invention, other and further embodiments of the invention may be devices without departing from the basic scope thereof, and the scope thereof is determined by the claims which follow.

What is claimed is:

1. An electrochemical device, comprising:
    a low pressure gas electrode, comprising:
        an electrically conducting and supporting substrate, wherein the substrate comprises at least two opposite faces; a plurality of openings allowing passage from one face to an opposite face, the openings encompassing between 10% and 90% of the total area of the substrate;
        an electrically conductive porous material bound to the substrate comprised of an electrically conductive component and a binding component, wherein the electrically conductive component comprises an intimate mixture of a powder and loose fibers; and
        a catalyst layer bound to the electrically conductive porous material.

2. The electrochemical device of claim 1, wherein the electrochemical cell is an electrolytic cell.

3. The electrochemical device of claim 2, wherein the electrolytic cell is an electrolyzer for the generation of hydrogen and oxygen from water.

4. The electrochemical device of claim 1, wherein the electrochemical cell is a fuel cell for the generation of electricity.

5. The electrochemical device of claim 4, wherein the cells are connected in a series to form an assembly with increased electrical potential.

6. The electrochemical device of claim 5, wherein the electrochemical cells are arranged in a bipolar configuration.

7. The electrochemical device of claim 5, wherein the electrochemical cells are arranged in a monopolar configuration.

8. A dual electrode structure comprising a first electrode and a second electrode, wherein the electrodes comprise:
    (a) an electrically conducting and supporting substrate; wherein said substrate comprises at least two opposite faces; a plurality of openings allowing passage from one face to an opposite face, said openings encompassing between 10% and 90 % of the total area of the substrate;
    (b) an electrically conductive porous material bound to the substrate comprised of an electrically conductive component and a binding component;
    (c) a catalyst layer bound to the electrically conductive porous material; and wherein the two electrodes share the same electrically conducting substrate.

9. The dual electrode structure of claim 8, further comprising a barrier to gas passage; wherein the barrier is formed between the two electrodes by sealing all of the open spaces of the conductive substrate; and wherein the electrodes having their electrocatalyst layers bound to opposite sides of the electrically conducting substrate.

10. The structure of claim 8, wherein binding component is electrically conductive.

11. The structure of claim 8, wherein the binding component is electrically non-conductive.

12. The structure of claim 8, wherein the area associated with the plurality of openings is greater than 20% and less than 80% of the total area of the substrate.

13. The structure of claim 8, wherein the area associated with the plurality of openings is greater tan 25% and less than 75% of the total area of the substrate.

14. The structure of claim 8, wherein the area associated with the plurality of openings is greater than 30% and less than 70% of the total area of the substrate.

15. The structure of claim 8, wherein the carbon comprises carbon.

16. The structure of claim 8, wherein the loose fibers comprise carbon.

17. A fuel cell stack comprising a plurality of dual electrode structures; each dual electrode structure comprising a first electrode and a second electrode, wherein the electrodes comprise:
    (a) an electrically conducting supporting substrate; wherein said substrate comprises at least two opposite faces; a plurality of openings allowing passage from one face to an opposite fare; said openings encompassing between 10% and 90 % of the total area of the substrate;
    (b) an electrically conductive porous material bound to the substrate comprised of a conductive component and a binding component;
    (c) an electrocatalyst layer bound to the substrate; and wherein the two electrodes share the same electrically conducting substrate; and wherein the first electrode forms the anode of a first fuel cell and the second electrode forms the cathode of an adjacent fuel cell; the fuel cells being connected in series to produce a potential larger than the potential of each individual fuel cell.

18. An apparatus, comprising:
(a) a frame having two opposing faces; and
(b) a set of first and second fuel cell stacks of claim 17; wherein the first fuel cell stack is attached to one face of the frame and the second fuel cell stack is attached to the opposite face of the frame; and wherein the set of stacks and the frame define a volume for internal storage of a reactant to be consumed by operation of the fuel cells;
(c) means to supply said internally stored reactant; and
(d) means to remove undesirable waste accumulated by operation of the fuel cell stacks.

19. An apparatus comprising:
(a) a frame having two opposing faces;
(b) a barrier; and
(c) a fuel cell stacks of claim 17; wherein the fuel cell stack is attached to one face of the frame and the barrier is attached to the opposite face of the frame; and wherein the stack, the barrier and to frame define a volume fir internal storage of a reactant to be consumed by operation of the fuel cells;
(d) means to supply said internally stored reactant; and
(e) means to remove undesirable waste accumulated by operation of the fuel cell stacks.

20. The apparatus of claim 19, manufactured from flexible materials, and wherein the barrier has a surface with a curved shape; the apparatus being mounted on the surface of the barrier and adopting the shape of the surface.

21. The apparatus of claim 19, further comprising an enclosed channel for the flow of a coolant to dissipate heat generated by operating the apparatus; and wherein the barrier provides one surface of the channel.

22. The apparatus of claim 21, wherein the channel is surrounded by at least one set of electrochemical coils.

23. The apparatus of claim 21, further comprising a heat transfer element positioned within the channel.

24. The apparatus of claim 21, further comprising means for improving the flow of the coolant through the channel.

25. The apparatus of claim 19, wherein the baffler has a portion that extends beyond the cells; said portion allowing the dissipation of the beat generated while operating the apparatus.

26. The apparatus of claim 25, wherein the barrier's portion extending beyond the fuel cells is bent to extend perpendicularly to the plane of the cells and providing a protection to portions of the electrodes that are exposed to the atmosphere.

27. The apparatus of claim 26, wherein the barrier is perforated and further bent to form a cover shield to protect portions of the electrodes that are exposed to the atmosphere.

* * * * *